(12) United States Patent
Patel et al.

(10) Patent No.: US 12,519,974 B2
(45) Date of Patent: Jan. 6, 2026

(54) MACHINE LEARNING BASED VIDEO PROCESSING

(71) Applicant: QUALCOMM Incorporated, San Diego, CA (US)

(72) Inventors: Shubham Deepak Patel, Gondia (IN); Pawan Aasudaram Budhwani, Amravati (IN); Saikumar Kondaparthi, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 104 days.

(21) Appl. No.: 18/485,909

(22) Filed: Oct. 12, 2023

(65) Prior Publication Data

US 2025/0126290 A1  Apr. 17, 2025

(51) Int. Cl.
| | |
|---|---|
| *H04N 19/59* | (2014.01) |
| *G06T 3/18* | (2024.01) |
| *G06T 5/20* | (2006.01) |
| *G06T 5/50* | (2006.01) |
| *G06V 10/44* | (2022.01) |
| *G06V 10/771* | (2022.01) |
| *H04N 19/172* | (2014.01) |

(52) U.S. Cl.
CPC ........... *H04N 19/59* (2014.11); *G06T 3/18* (2024.01); *G06T 5/20* (2013.01); *G06T 5/50* (2013.01); *G06V 10/44* (2022.01); *G06V 10/771* (2022.01); *H04N 19/172* (2014.11); *G06T 2207/20221* (2013.01)

(58) Field of Classification Search
None
See application file for complete search history.

(56) References Cited

U.S. PATENT DOCUMENTS

| | | | | |
|---|---|---|---|---|
| 9,288,505 | B2* | 3/2016 | Chen | H04N 19/597 |
| 10,979,727 | B2* | 4/2021 | Hannuksela | H04N 19/132 |
| 2013/0188686 | A1* | 7/2013 | Tourapis | H04N 19/59 |
| | | | | 375/240.02 |
| 2015/0294186 | A1 | 10/2015 | Ali et al. | |
| 2016/0086336 | A1* | 3/2016 | Lin | H04N 13/282 |
| | | | | 348/50 |

(Continued)

FOREIGN PATENT DOCUMENTS

CN  115564663 A  1/2023

OTHER PUBLICATIONS

Partial International Search Report—PCT/US2024/049087—ISA/EPO—Dec. 23, 2024.

(Continued)

*Primary Examiner* — Talha M Nawaz
(74) *Attorney, Agent, or Firm* — QUALCOMM Incorporated; Espartaco Diaz Hidalgo

(57) ABSTRACT

Disclosed are systems, apparatuses, processes, and computer-readable media for upscaling video. An apparatus configured to process one or more frames (e.g., one or more video frames) comprises one or more processors coupled to the one or more memories. The one or more processors are configured to: obtain a first frame from an image sensor; downsample the first frame into a first downsampled frame based on a transfer function associated with the image sensor; and encode the first downsampled frame.

26 Claims, 20 Drawing Sheets

(56) References Cited

U.S. PATENT DOCUMENTS

| | | | |
|---|---|---|---|
| 2016/0132284 A1* | 5/2016 | Amara Venkata | G09G 5/14 |
| | | | 345/634 |
| 2017/0223368 A1* | 8/2017 | Abbas | H04N 19/187 |
| 2019/0251681 A1* | 8/2019 | Hogasten | G06T 5/92 |
| 2023/0144562 A1* | 5/2023 | Zirr | G06N 3/084 |
| | | | 345/419 |
| 2024/0096042 A1* | 3/2024 | Ikizyan | G06T 7/90 |
| 2024/0179304 A1* | 5/2024 | Ye | H04N 19/186 |
| 2024/0422360 A1* | 12/2024 | Kang | H04N 19/105 |

OTHER PUBLICATIONS

International Search Report and Written Opinion—PCT/US2024/049087—ISA/EPO—Feb. 13, 2025.

\* cited by examiner

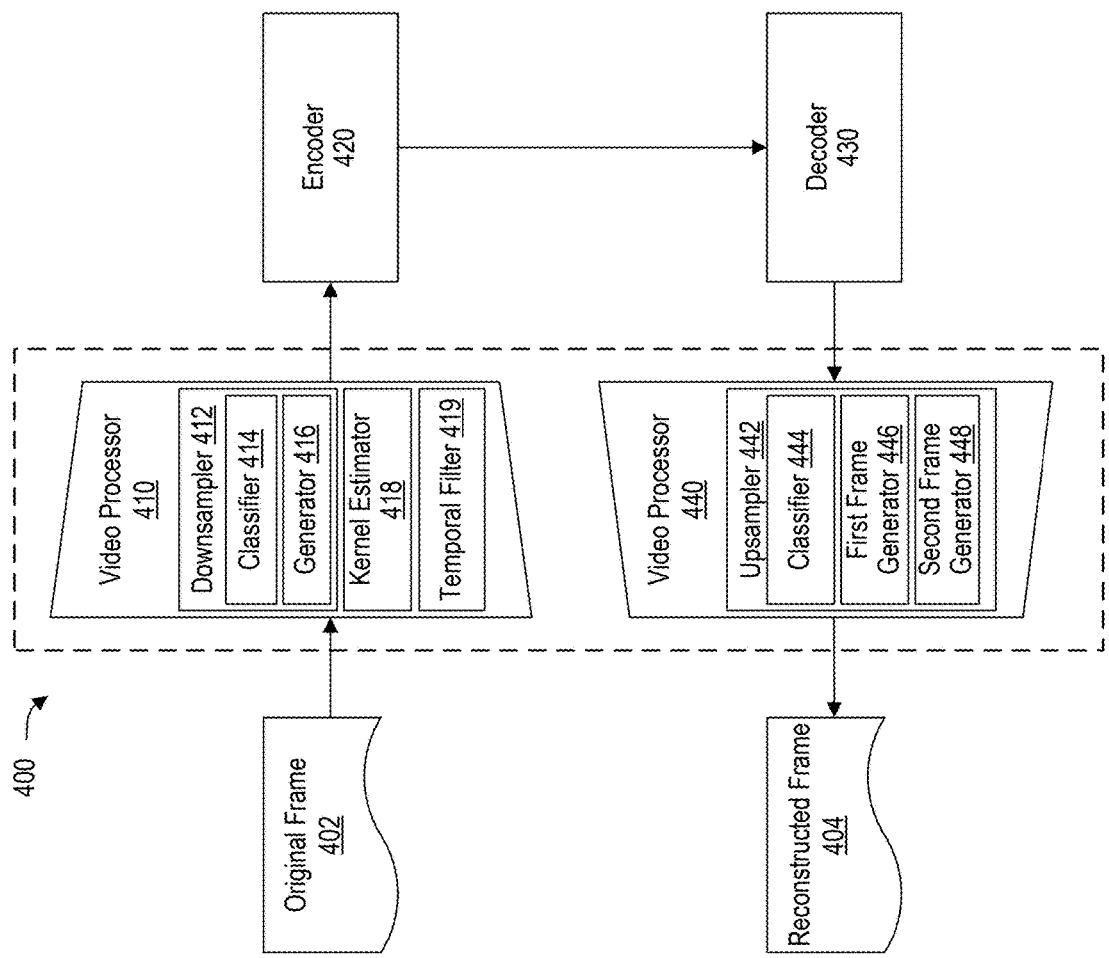

MACHINE LEARNING BASED VIDEO PROCESSING

FIELD

The present disclosure generally relates to mobile devices and other devices including multimedia functions. For example, aspects of the present disclosure relate to systems and techniques that provide machine learning (e.g., deep neural network) based video processing (e.g., downsampling for compression and upsampling for decompression).

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

An artificial neural network can be implemented using computer technology inspired by logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

In some examples, systems, and techniques are described for multimedia functions. For example, the systems and techniques can be used for real-time machine learning based video processing system.

Disclosed are systems, apparatuses, methods, computer readable media, and circuits for processing one or more frames (e.g., one or more video frames). According to at least one example, a method includes: obtaining a first frame from an image sensor; downsampling the first frame into a first downsampled frame based on a transfer function associated with the image sensor; and encoding the first downsampled frame.

In another example, an apparatus configured to process one or more frames is provided that includes one or more memories and one or more processors coupled to the one or more memories and configured to: obtain a first frame from an image sensor; downsample the first frame into a first downsampled frame based on a transfer function associated with the image sensor; and encode the first downsampled frame.

In another example, a non-transitory computer-readable storage medium comprising instructions stored thereon which, when executed by one or more processors, causes the one or more processors to: obtain a first frame from an image sensor; downsample the first frame into a first downsampled frame based on a transfer function associated with the image sensor; and encode the first downsampled frame.

In another example, an apparatus for encoding video, comprising: means for obtaining a first frame from an image sensor; means for downsampling the first frame into a first downsampled frame based on a transfer function associated with the image sensor; and means for encoding the first downsampled frame.

In another example, a method includes: receiving a first frame; determining a type of the first frame based on a previous frame, wherein the type of the first frame comprises an independent frame or a dependent frame; and generating a first upsampled frame based on the type of the first frame.

In another example, an apparatus for processing one or more frames is provided that includes one or more memories and one or more processors coupled to the one or more memories and configured to: receive a first frame; determine a type of the first frame based on a previous frame, wherein the type of the first frame comprises an independent frame or a dependent frame; and generate a first upsampled frame based on the type of the first frame.

In another example, a non-transitory computer-readable storage medium comprising instructions stored thereon which, when executed by one or more processors, causes the one or more processors to: receive a first frame; determine a type of the first frame based on a previous frame, wherein the type of the first frame comprises an independent frame or a dependent frame; and generate a first upsampled frame based on the type of the first frame.

In another example, an apparatus for encoding video, comprising: means for determining a type of the first frame based on a previous frame, wherein the type of the first frame comprises an independent frame or a dependent frame; and means for generating a first upsampled frame based on the type of the first frame.

In some aspects, one or more the apparatuses or devices described herein is, is part of, and/or includes a wearable device, an extended reality (XR) device (e.g., a virtual reality (VR) device, an augmented reality (AR) device, or a mixed reality (MR) device, such as an XR head-mounted device (HMD) device or XR glasses), a wireless communication device such as a mobile device (e.g., a mobile telephone and/or mobile handset and/or so-called "smartphone" or another mobile device), a vehicle or a computing device or system of a vehicle, a camera, a personal computer, a laptop computer, a server computer, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers or gyroscopes, one or more accelerometers, any combination thereof, and/or other sensors).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures:

FIG. 4 is a block diagram illustrating an example of real-time machine learning based video processing system using predictive point spread function (PSF) of a frame, in accordance with some aspects of the disclosure;

DETAILED DESCRIPTION

Figure 1:
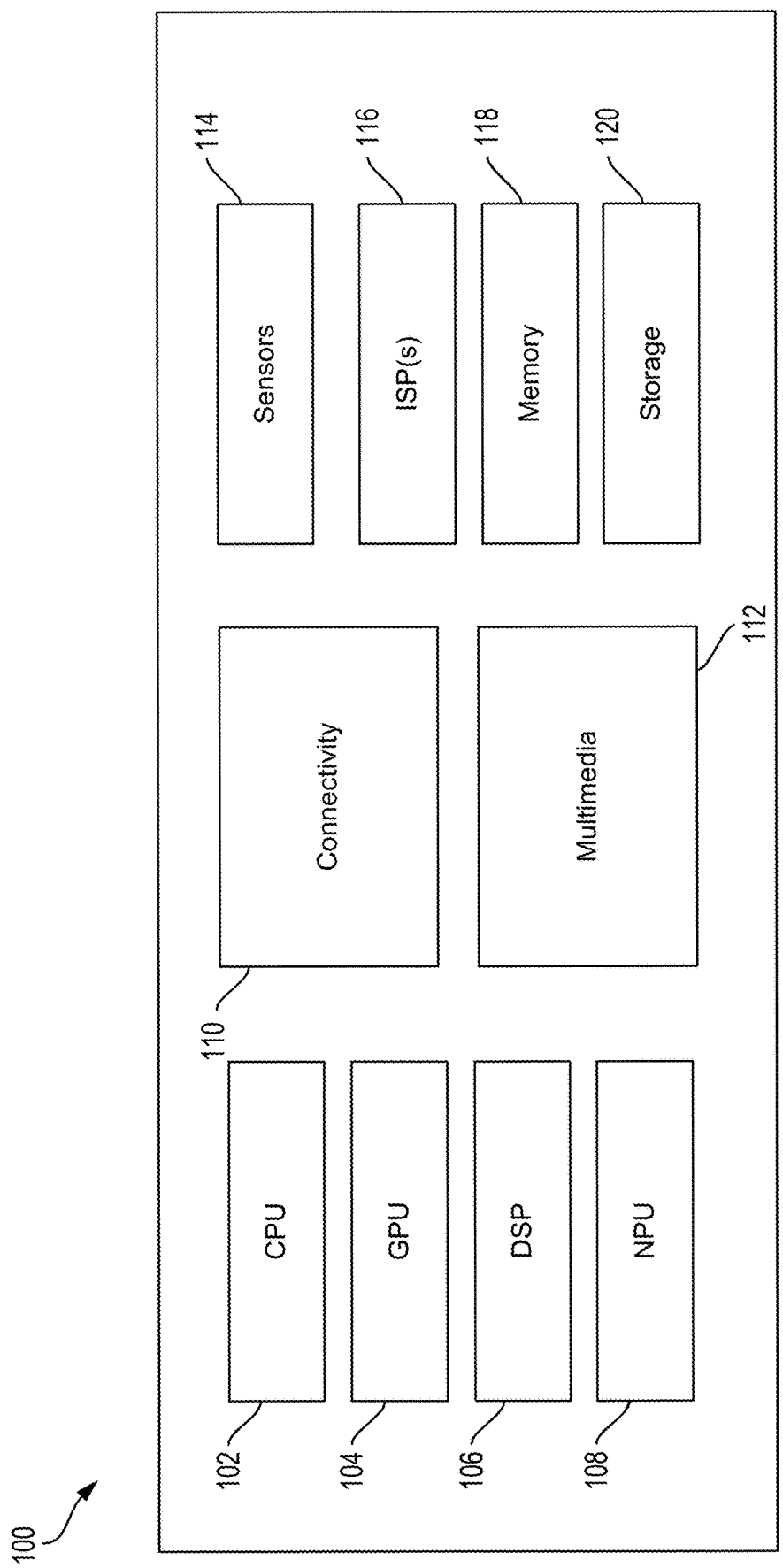
FIG. 1 illustrates an example implementation of a system-on-a-chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the disclosure. However, it will be apparent that various aspects and examples may be practiced without these specific details. The figures and description are not intended to be restrictive.

The ensuing description provides exemplary aspects and examples only, and is not intended to limit the scope, applicability, or configuration of the disclosure. Rather, the ensuing description of the exemplary aspects and examples will provide those skilled in the art with an enabling description for implementing aspects and examples of the disclosure. It should be understood that various changes may be made in the function and arrangement of elements without departing from the scope of the application as set forth in the appended claims.

As noted previously, various devices and systems allow a scene to be captured by generating images (or frames) and/or video data (including multiple frames) of the scene. A camera is a device that receives light from a scene and captures images, such as still images or video frames, using an image sensor. The terms "image," "image frame," and "frame" are used interchangeably herein. Cameras may include processors, such as image signal processors (ISPs), that can receive one or more images and process the one or more images. For example, a raw image frame captured by a camera sensor can be processed by an ISP to generate a final image. Processing by the ISP can be performed by a plurality of filters or processing blocks being applied to the captured image, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Machine learning systems (e.g., deep neural network systems or models) can be used to perform a variety of tasks such as, for example and without limitation, video encoding (or compression) and/or video decoding (or decompression), detection and/or recognition (e.g., scene or object detection and/or recognition, face detection and/or recognition, etc.), depth estimation, pose estimation, image reconstruction, classification, three-dimensional (3D) modeling, dense regression tasks, data compression and/or decompression, and image processing, among other tasks. For instance, various ISP operations (e.g., ISP processing blocks, including one or more of the processing blocks described above) can be implemented using one or more machine learning networks. An image processing machine network can be included in the ISP and/or can be separate from the ISP. Moreover, machine learning models can be versatile and can achieve high quality results in a variety of tasks. In some cases, an image processing machine learning network can be trained and/or implemented based on a use case associated with the input image data and/or output image data of the image processing machine learning network.

Image data (e.g., images, image frames, frames, etc., obtained using a camera) can be used for various purposes. In some examples, image data can be provided as input to a decision-making algorithm associated with surveillance, detection, and/or maneuvering, etc. For instance, a camera feed (e.g., image data) can be provided as input to an autonomous or semi-autonomous vehicle control system. The image data may in some cases be provided in combination with various other sensor inputs associated with or corresponding to the image data (e.g., sensor inputs captured at a same or similar time as the images, in a same or similar location or environment as the images, etc.). For example, image data can be used to perform tasks such as road-boundary detection, sign-board detection, pathway detection, autonomous or semi-autonomous maneuvering, surveillance monitoring, etc.

Video streaming is a common way for consumers to experience media content, such as using a smartphone, gaming application, entertainment such as a live game, and work such as a video conference. Streaming is also important in autonomous vehicles, security cameras, smart connected cities, connected devices, and even social media. It can be important to efficiently provide video streaming without loss of quality and with low processor utilization and server storage costs. A critical challenge for video streaming is to reduce bandwidth and processor consumption. This reduction in bandwidth and processor consumption is vital for several reasons, such as the need for a seamless and enjoyable user experience. High bandwidth and processor consumption can result in buffering and lag, causing frustration for viewers. In an era where users expect smooth, uninterrupted streaming, optimizing bandwidth resources is essential.

Reducing bandwidth and processor consumption is crucial for sustainability and resource management. Video streaming platforms are responsible for a significant portion of global internet traffic, and the excessive use of bandwidth and processing power can strain network infrastructure and increase carbon emissions. By implementing efficient compression algorithms and optimizing video delivery, streaming services can reduce their environmental impact and contribute to a greener digital ecosystem. Furthermore, cost efficiency is a significant factor in the success of video streaming applications. Data centers and network infrastructure maintenance represent significant expenses for streaming providers. By minimizing bandwidth and processor usage, video streaming platforms can lower their operational costs and offer competitive pricing to their subscribers.

Video encoders-decoders (referred to collectively as codecs) are fundamental to the functionality of countless applications, devices, and systems. Computing devices such as mobile phones, laptops, electric vehicles, may include a hardware video codec with a long support life cycle to ensure wide adoption and compatibility with other devices. The longevity of support is crucial to maintain compatibility and reliability across these diverse ecosystems. For example, the video industry continually evolves with new compression standards and technologies emerging over time. Ensuring long support lifecycles for video decoders allows for the seamless adoption of new video formats without disrupting existing infrastructure.

Upscaling techniques can be used to increase a resolution of lower-quality video. However, upscaling of the video using conventional techniques (e.g., bicubic and bilinear techniques) can result in degradation (e.g., noise and other visual artifacts) of the video, which reduces the user experience when viewing the video. Such degradation can be evident in reduced clarity, blurred details, and pixelation, which collectively detract from the overall viewing experience. Such an issue can be particularly pronounced when users attempt to watch high-definition content on displays that lack the pixel density to accurately represent the finer nuances of the video. The trade-off between high-resolution content and the limitations of the device's display resolution underscores the importance of optimizing video formats and quality for various mobile devices, ensuring that users can enjoy an optimal viewing experience regardless of the device being used.

Super resolution (SR) is a machine learning (ML) technology that leverages advanced ML algorithms to enhance the resolution and quality of digital images or videos. For example, by analyzing and extrapolating patterns from low-resolution source content, SR algorithms predict and generate higher-resolution versions of the content, resulting in improved clarity, finer details, and enhanced visual fidelity. However, the use of SR consumes a significant amount of power on mobile devices.

Systems, apparatuses, processes (also referred to as methods), and computer-readable media (collectively referred to as "systems and techniques") are described herein that provide a machine learning based video processing system (e.g., using one or more neural network models). In some aspects, the machine learning based video processing system can include a downsampler that can perform downsampling of video frames (e.g., for encoding or compression of the downsampled video) and an upsampler that can perform upsampling of video frames (e.g., upsampling of decoded or decompressed video). The downsampler and the upsampler can be implemented using one or more machine learning models. The machine learning based video processing system can perform the downsampling and upsampling independently of conventional hardware and software video codecs. The downsampler can reduce compression complexity by down scaling input video frames by a certain amount of resolution (e.g., reduced by 4 times (4×) resolution). The upsampler can compensate for the missing information caused by the downsampling and compression by upsampling the frames (e.g., by the amount of resolution for which the frames were downsampled, such as by upsampling the frames by 4×).

In some cases, the machine learning based video processing system can include a kernel estimator that can estimate a point spread function (PSF), or a super resolution (SR) kernel or degradation kernel, that is associated with the device and video. In some cases, the kernel estimator is part of the same machine learning model as the downsampler and/or upsampler. In other cases, the kernel estimator is a separate machine learning model. For instance, video frames can be downsampled and/or upsampled using the PSF or SR kernel. In some case, the systems and techniques can perform on-device training to train the kernel estimator machine learning model to estimate the PSF or SR kernels (resulting in kernel priors). In some cases, the downsampler can be a temporal downsampler (e.g., a recurrent temporal downsampler) that can correct for temporal noise, which may be introduced based on temporal or other alignment issues between frames. As noted previously, the downsampled frames can be encoded or compressed by a video codec. The video codec can be any type of video codec, such as a convention standard-based codec (e.g., defined by H.264, H.265, H.266, etc.) or a machine learning based codec (e.g., using one or more neural network models).

In some aspects, the upsampler may receive decoded (or decompressed) frames from a decoder or a video codec. The upsampler can upsample the frame (e.g., independently of the video decoder) to increase the resolution of the frame. The SR kernels priors that are learned during training at the device can be used in a shallow upsampling branch to recover low frequency textures in a manner that reduces various artifacts, such as compression artifacts, staircasing, and so forth.

Additional aspects of the present disclosure are described in more detail below.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor, image signal processors (ISPs) 116, and/or storage 120.

The SOC 100 may be based on an ARM instruction set. In an aspect of the present disclosure, the instructions loaded into the CPU 102 may include code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may include code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform depth completion according to aspects of the present disclosure.

SOC 100 can be part of a computing device or multiple computing devices. In some examples, SOC 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, one or more sensors 114, the sensor processor, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

Figure 2:
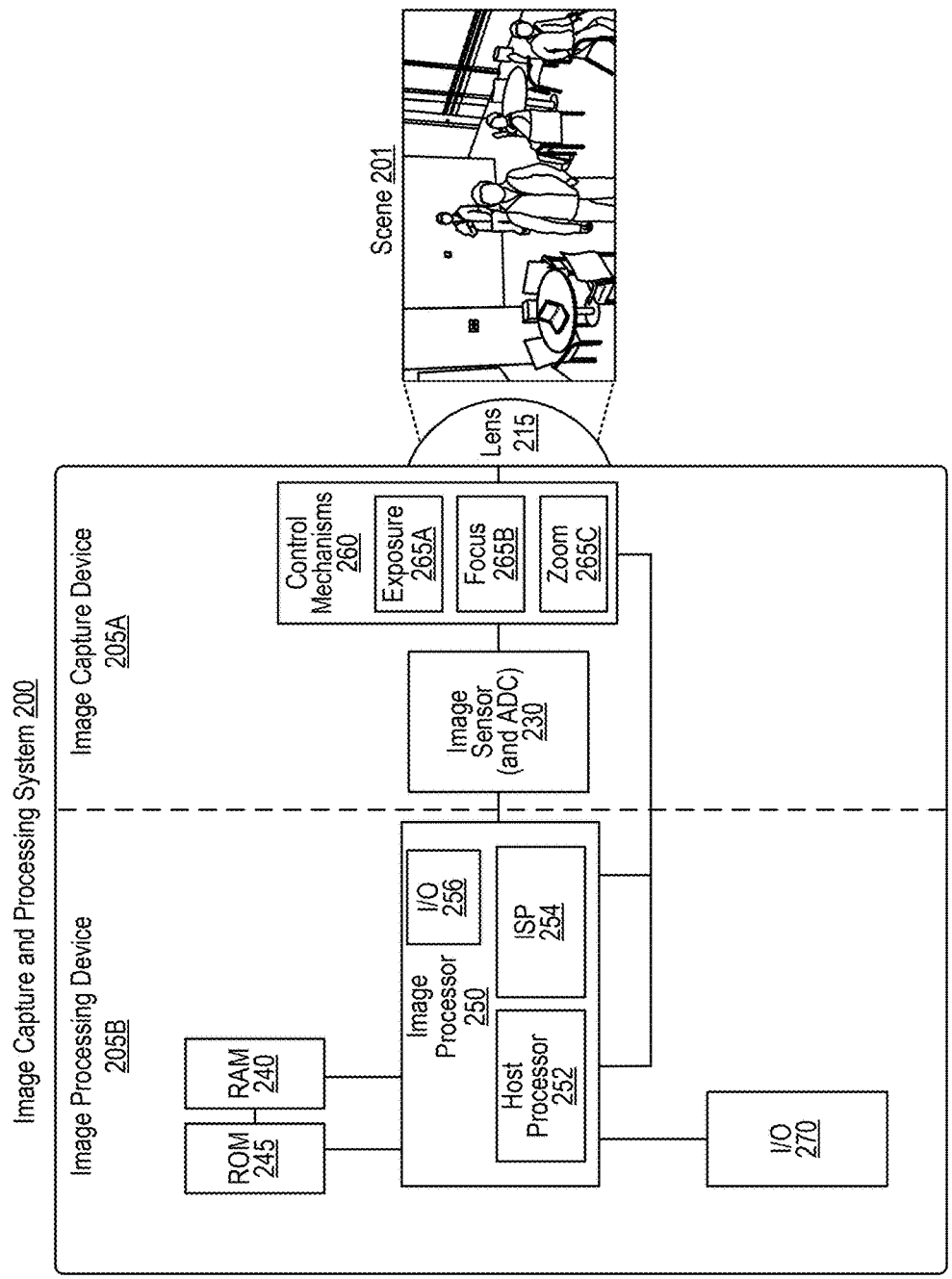
FIG. 2 is a block diagram illustrating an example architecture of an image capture and processing system, in accordance with some examples.

FIG. 2 is a block diagram illustrating an architecture of an image capture and processing system 200. The image capture and processing system 200 includes various components that are used to capture and process images of scenes (e.g., an image of a scene 201). The image capture and processing system 200 can capture standalone images (or photographs) and/or can capture videos that include multiple images (or video frames) in a particular sequence. A lens 215 of the system 200 faces a scene 201 and receives light from the scene 201. The lens 215 bends the light toward the image sensor 230. The light received by the lens 215 passes through an aperture controlled by one or more control mechanisms 260 and is received by an image sensor 230.

The one or more control mechanisms 260 may control exposure, focus, and/or zoom based on information from the image sensor 230 and/or based on information from the image processor 250. The one or more control mechanisms 260 may include multiple mechanisms and components; for instance, the control mechanisms 260 may include one or more exposure control mechanisms 265A, one or more focus control mechanisms 265B, and/or one or more zoom control mechanisms 265C. The one or more control mechanisms 260 may also include additional control mechanisms besides those that are illustrated, such as control mechanisms controlling analog gain, flash, HDR, depth of field, and/or other image capture properties.

The focus control mechanism 265B of the control mechanisms 260 can obtain a focus setting. In some examples, focus control mechanism 265B store the focus setting in a memory register. Based on the focus setting, the focus control mechanism 265B can adjust the position of the lens 215 relative to the position of the image sensor 230. For example, based on the focus setting, the focus control mechanism 265B can move the lens 215 closer to the image sensor 230 or farther from the image sensor 230 by actuating a motor or servo, thereby adjusting focus. In some cases, additional lenses may be included in the system 200, such as one or more microlenses over each photodiode of the image sensor 230, which each bend the light received from the lens 215 toward the corresponding photodiode before the light reaches the photodiode. The focus setting may be determined via contrast detection autofocus (CDAF), phase detection autofocus (PDAF), or some combination thereof. The focus setting may be determined using the control mechanism 260, the image sensor 230, and/or the image processor 250. The focus setting may be referred to as an image capture setting and/or an image processing setting.

The exposure control mechanism 265A of the control mechanisms 260 can obtain an exposure setting. In some cases, the exposure control mechanism 265A stores the exposure setting in a memory register. Based on this exposure setting, the exposure control mechanism 265A can control a size of the aperture (e.g., aperture size or f/stop), a duration of time for which the aperture is open (e.g., exposure time or shutter speed), a sensitivity of the image sensor 230 (e.g., ISO speed or film speed), analog gain applied by the image sensor 230, or any combination thereof. The exposure setting may be referred to as an image capture setting and/or an image processing setting.

The zoom control mechanism 265C of the control mechanisms 260 can obtain a zoom setting. In some examples, the zoom control mechanism 265C stores the zoom setting in a memory register. Based on the zoom setting, the zoom control mechanism 265C can control a focal length of an assembly of lens elements (lens assembly) that includes the lens 215 and one or more additional lenses. For example, the zoom control mechanism 265C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 215 in some cases) that receives the light from the scene 201 first, with the light then passing through an afocal zoom system between the focusing lens (e.g., lens 215) and the image sensor 230 before the light reaches the image sensor 230. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 265C moves one or more of the lenses in the afocal zoom system, such as the negative lens and one or both of the positive lenses.

The image sensor 230 includes one or more arrays of photodiodes or other photosensitive elements. Each photodiode measures an amount of light that eventually corresponds to a particular pixel in the image produced by the image sensor 230. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 230 may alternately or additionally include opaque and/or reflective masks that block light from reaching certain photodiodes, or portions of certain photodiodes, at certain times and/or from certain angles, which may be used for phase detection autofocus (PDAF). The image sensor 230 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 260 may be included instead or additionally in the image sensor 230. The image sensor 230 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 250 may include one or more processors, such as one or more image signal processors (ISPs) (including ISP 254), one or more host processors (including host processor 252), and/or one or more of any other type of processor 2010 discussed with respect to the computing system 2000. The host processor 252 can be a digital signal processor (DSP) and/or other type of processor. In some implementations, the image processor 250 is a single integrated circuit or chip (e.g., referred to as a system-on-chip or SoC) that includes the host processor 252 and the ISP 254. In some cases, the chip can also include one or more input/output ports (e.g., input/output (I/O) ports 256), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 256 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 252 can communicate with the image sensor 230 using an I2C port, and the ISP 254 can communicate with the image sensor 230 using an MIPI port.

The image processor 250 may perform a number of tasks, such as de-mosaicing, color space conversion, image downsampling, pixel interpolation, automatic exposure (AE) control, automatic gain control (AGC), CDAF, PDAF, automatic white balance, merging of images to form an HDR image, image recognition, object recognition, feature recognition, receipt of inputs, managing outputs, managing memory, or some combination thereof. The image processor 250 may store images and/or processed images in random access memory (RAM) 240/1425, read-only memory (ROM) 245/1420, a cache 1412, a memory unit (e.g., system memory 1415), another storage device 1430, or some combination thereof.

Various input/output (I/O) devices 270 may be connected to the image processor 250. The I/O devices 270 can include a display screen, a keyboard, a keypad, a touchscreen, a trackpad, a touch-sensitive surface, a printer, any other output devices, any other input devices, or some combination thereof. In some cases, a caption may be input into the image processing device 205B through a physical keyboard or keypad of the I/O devices 270, or through a virtual keyboard or keypad of a touchscreen of the I/O devices 270. The I/O 256 may include one or more ports, jacks, or other connectors that enable a wired connection between the system 200 and one or more peripheral devices, over which the system 200 may receive data from the one or more peripheral device and/or transmit data to the one or more peripheral devices. The I/O 256 may include one or more wireless transceivers that enable a wireless connection between the system 200 and one or more peripheral devices, over which the system 200 may receive data from the one or more peripheral device and/or transmit data to the one or more peripheral devices. The peripheral devices may include any of the previously-discussed types of I/O devices 270 and may themselves be considered I/O devices 270 once they are coupled to the ports, jacks, wireless transceivers, or other wired and/or wireless connectors.

In some cases, the image capture and processing system 200 may be a single device. In some cases, the image capture and processing system 200 may be two or more separate devices, including an image capture device 205A (e.g., a camera) and an image processing device 205B (e.g., a computing device coupled to the camera). In some implementations, the image capture device 205A and the image processing device 205B may be coupled together, for example via one or more wires, cables, or other electrical connectors, and/or wirelessly via one or more wireless transceivers. In some implementations, the image capture device 205A and the image processing device 205B may be disconnected from one another.

As shown in FIG. 2, a vertical dashed line divides the image capture and processing system 200 of FIG. 2 into two portions that represent the image capture device 205A and the image processing device 205B, respectively. The image capture device 205A includes the lens 215, control mechanisms 260, and the image sensor 230. The image processing device 205B includes the image processor 250 (including the ISP 254 and the host processor 252), the RAM 240, the ROM 245, and the I/O 256. In some cases, certain components illustrated in the image capture device 205A, such as the ISP 254 and/or the host processor 252, may be included in the image capture device 205A.

The image capture and processing system 200 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 200 can include one or more wireless transceivers for wireless communications, such as cellular network communications, 802.11 Wi-Fi communications, wireless local area network (WLAN) communications, or some combination thereof. In some implementations, the image capture device 205A and the image processing device 205B can be different devices. For instance, the image capture device 205A can include a camera device and the image processing device 205B can include a computing device, such as a mobile handset, a desktop computer, or other computing device.

While the image capture and processing system 200 is shown to include certain components, one of ordinary skill will appreciate that the image capture and processing system 200 can include more components than those shown in FIG. 2. The components of the image capture and processing system 200 can include software, hardware, or one or more combinations of software and hardware. For example, in some implementations, the components of the image capture and processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 200.

The host processor 252 can configure the image sensor 230 with new parameter settings (e.g., via an external control interface such as I2C, I3C, SPI, GPIO, and/or other interface). In one illustrative example, the host processor 252 can update exposure settings used by the image sensor 230 based on internal processing results of an exposure control algorithm from past images. The host processor 252 can also dynamically configure the parameter settings of the internal pipelines or modules of the ISP 254 to match the settings of one or more input images from the image sensor 230 so that the image data is correctly processed by the ISP 254. Processing (or pipeline) blocks or modules of the ISP 254 can include modules for lens (or sensor) noise correction, de-mosaicing, color conversion, correction or enhancement/suppression of image attributes, denoising filters, sharpening filters, among others. Each module of the ISP 254 may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
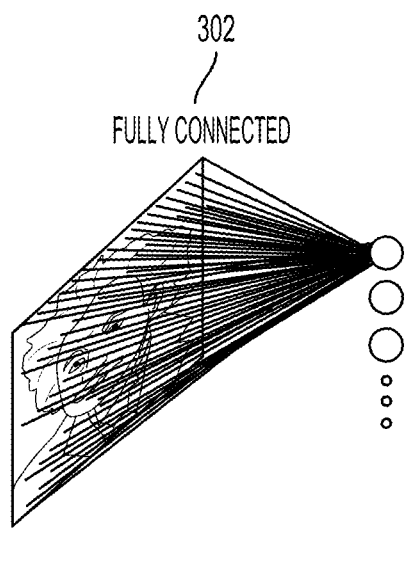
FIG. 3A illustrates an example of a fully connected neural network, in accordance with some examples.
Figure 3B:
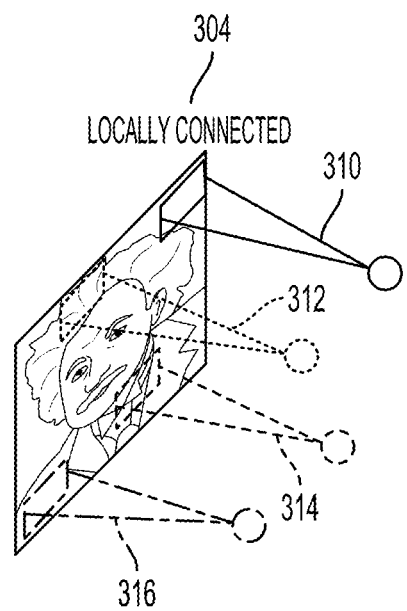
FIG. 3B illustrates an example of a locally connected neural network, in accordance with some examples.

The connections between layers of a neural network may be fully connected or locally connected. FIG. 3A illustrates an example of a fully connected neural network 302. In a fully connected neural network 302, a neuron in a first hidden layer may communicate its output to every neuron in a second hidden layer, so that each neuron in the second layer will receive input from every neuron in the first layer. FIG. 3B illustrates an example of a locally connected neural network 304. In a locally connected neural network 304, a neuron in a first hidden layer may be connected to a limited number of neurons in a second hidden layer. More generally, a locally connected layer of the locally connected neural network 304 may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Figure 3C:
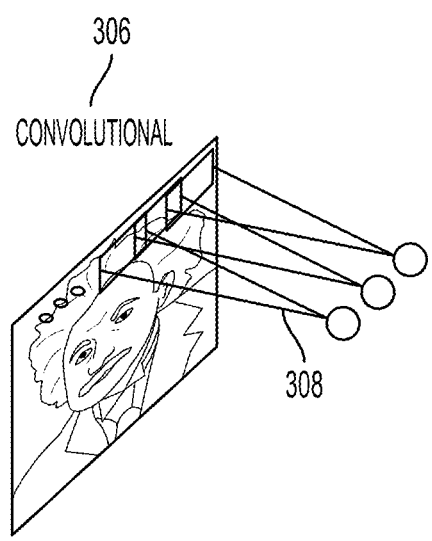
FIG. 3C illustrates an example of a convolutional neural network, in accordance with some examples.

One example of a locally connected neural network is a convolutional neural network. FIG. 3C illustrates an example of a convolutional neural network 306. The convolutional neural network 306 may be configured such that the connection strengths associated with the inputs for each neuron in the second layer are shared (e.g., 308). Convolutional neural networks may be well suited to problems in which the spatial location of inputs is meaningful. Convolutional neural network 306 may be used to perform one or more aspects of image processing, according to aspects of the present disclosure. An illustrative example of a deep learning network is described in greater depth with respect to the example block diagram of FIG. 12. An illustrative example of a convolutional neural network is described in greater depth with respect to the example block diagram of FIG. 13.

Deep convolutional networks (DCNs) are networks of convolutional networks, configured with additional pooling and normalization layers. DCNs can achieve high performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less than, for example, that of a similarly sized neural network that includes recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Video frames may include various artifacts and other types of noise that can be introduced during frame upscaling using ML models. In some aspects, examples of ML models include SR functions for increasing resolution. SR techniques may be power efficient, but correction of the various noises that are introduced into the frames is non-trivial. For example, a video frame may have temporal misalignment that degrades the quality of upscaled frames. Temporal misalignment occurs when the frames in a video sequence are not synchronized or aligned correctly over time. This can occur for various reasons, such as errors in video capture or transmission, frame rate discrepancies, or disruptions in the video stream and results in visual artifacts, such as stuttering, frame duplication, or motion discontinuities in the decoded video, negatively impacting the viewing experience.

In another example, a video frame may include checkerboarding that occurs during video compression and decompression. Checkerboarding includes visual artifacts that occur when a compressed video is decoded and displayed, resulting in a checkerboard-like pattern of alternating blocks or pixels. Checkerboarding artifacts typically appear when there is a loss of data or corruption in the compressed video stream, leading to incorrect reconstruction of image details. Checkerboarding can be especially noticeable in low-bitrate or highly compressed videos, and can manifest as alternating areas of high and low image quality.

In another example, a video frame may include blurring that occurs during video compression and decompression. The blurring can be based on the compression of information during a predictive algorithm and removes information that is not accurately reproduced when encoded.

In another example, a video frame may include flickering that can be based on video compression and decompression. Flickering can occur when a compressed video is played back. Such flickering is characterized by rapid and irregular changes in brightness or contrast, which create a flickering effect on the screen. Flickering can result from compression artifacts, especially when a compression algorithm is unable to represent certain types of content, such as fine details, high-frequency patterns, or fast motion.

In another example, a video frame may include staircasing artifacts that can occur during video compression and decompression. Staircasing is also known as "blocky artifacts," and is a visual distortion that is manifested as visible, grid-like blocks or steps along edges and contours within the video frames. This artifact results from the quantization process used in video compression, where frames are divided into blocks, and the compression algorithm approximates the pixel values within these blocks. When the compression ratio is high or when there are limitations in bit depth, the block boundaries become more pronounced, leading to the staircasing effect.

In another example, a video frame may include compression artifacts that occur during video compression and decompression. Compression artifacts are visual imperfections or distortions that occur in a compressed video frame when compared to the original, uncompressed video frame. These artifacts are a result of the data reduction techniques used to reduce the file size of the video, often involving lossy compression methods. Common compression artifacts include blockiness or pixelation (blocky artifacts), blurring of fine details, color bleeding, banding (stripes or abrupt color transitions), ringing (halos around edges), and mosquito noise (small, high-frequency distortions).

In another example, a video frame may include color bleeding that occurs during video compression and decompression. Color bleeding artifacts in video compression refer to a visual distortion where colors from one part of a frame unintentionally bleed or spill into adjacent areas, creating an unnatural and smeared appearance. Color bleeding can be particularly noticeable in areas of high color contrast, such as the boundaries between objects or along the edges of text or graphics, leading to a muddying or smudging effect.

As noted previously, a machine learning based video processing system is provided that includes a downsampler that can downsample video frames prior to encoding (or compression) of the video frames (e.g., by a conventional compression encoder or codec, such as an encoder or codec configured to operate using one or more of MP4, H.264, H.265, H.266, etc.) and an upsampler that can upsample decoded frames. For example, the upsampler can receive the decoded frames from a video decoder or codec (e.g., by a conventional compression decoder or codec, such as a decoder or codec configured to operate using one or more of MP4, H.264, H.265, H.266, etc.) that decodes (or decompresses) encoded (or compressed) frames to generate the decoded frames. The machine learning based video processing system can learn super resolution (SR) kernel priors (also referred to as a degradation kernel priors) that define a point spread function (PSF) for downsampled frames (e.g., how each pixel in a high-resolution frame is spread or blurred across neighboring pixels in a low-resolution frame that is a downsampled version of the high-resolution frame) using various techniques described below. The SR kernel priors can be used by the upsampler to upsample the frames. In some cases, the is a real-time (or near-real time) machine learning based video processing system that can downsample and/or upsample frames as they are received.

FIG. 4 is a block diagram illustrating an example of a machine learning based video processing system 400, in accordance with some aspects of the disclosure. In some aspects, the machine learning based video processing system 400 includes a video processor 410 that processes original frames (e.g., original frame 402) and provides the processed video frames to an encoder 420. The machine learning based video processing system 400 also includes a video processor 440 that processes decoded frames received from a decoder 430 to generate reconstructed frames (e.g., reconstructed frame 404). In some examples, the original frames and the reconstructed frames are video frames. In some aspects, the video processor 410 and the video processor 440 are independent of the encoder 420 and the decoder 430. For instance, the encoder 420 and the decoder 430 may be fixed components relative to the machine learning based video processing system 400, in which case encoded (compression) and decoding (decompression) operations of the encoder 420 and decoder 430, respectively, may not change. In some cases, the encoder 420 and the decoder 430 may be separate integrated circuits (or a single codec integrated circuit) from one or more integrated circuits implementing the video processor 410 and the video processor 440.

The machine learning based video processing system 400 may be implemented in different configurations depending on the function of the system 400. For example, an image capturing system or a streaming service may implement the video processor 410 in some cases the encoder 420 to encode video content, and a client device for decoding video content may include the video processor 440 and in some cases the decoder 430. In some aspects, devices may also implement a video processor 410 and a video processor 440. For example, a device may process video content using video processor 410, encode the video content using the encoder 420, and store the encoded content and/or transmit the encoded content to one or more other devices for decoding and processing. In such an example, the device may further receive encoded video content from storage and/or from one or more other devices, decode the encoded video content using decoder 430, and output reconstructed frames (e.g., reconstructed frame 404) for display or other purpose. In another example, a video conferencing service may implement both the video processor 410 and the video processor 440 to improve compression for real-time video communications.

As noted above, the video processor 410 is configured to receive an original frame 402 and downsample the original frame 402 using a downsampler 412 in some cases a kernel estimator 418 and/or temporal filter 419. The video processor 410 can output the processed original frame 402 to the encoder 420 for encoding/compression. The encoder 420 can encode (or compress) the downsampled frame. The encoder 420 can output the encoded frame to the decoder 430. In some cases, as described above, the encoder 420 can output the encoded frame to a storage device for storage and/or to one or more other devices for encoding. The decoder 430 can decode the encoded frame to generate a decoded frame. The decoded frame is a reconstructed version of the downsampled original frame 402 output by the video processor 410. The video processor 440 can upsample the downsampled frame to generate a reconstructed frame 404 having a resolution corresponding to (e.g., the same as) the original frame 402.

The video processor 410 includes a machine learning (ML) model (or multiple ML models) that is/are configured to perform one or more of the operations. In some aspects, the ML model(s) can include one or more neural network models. As shown in FIG. 4, the video processor 410 includes the downsampler 412, the kernel estimator 418, and the temporal filter 419. The downsampler 412 is configured to downsample the original frame 402 from a first resolution to a second resolution that is lower than the first resolution (e.g., from a 1080p resolution to a 270p resolution, from a 720p resolution to a 180p resolution, etc.).

The downsampler 412 includes a frame classifier 414 and a predictive generator 416. The frame classifier 414 is configured to classify the original frame 402 as an independent frame or a dependent frame. An independent frame is independent of any previous or subsequent frames, and a dependent frame depends on a previous frame (e.g., generated based on a previously-decoded frame). A dependent frame may also be referred to herein as a differential frame, which includes information indicating differences between a previous frame and a current frame. As noted previously, the video processor 410 and the video processor 440 may be independent of the encoder 420 and the decoder 430. In such cases, the frame classifier 414 may identify independent frames and dependent frames independently from intra-coded frames (I-frames) and inter-coded frames (P-frames or B-frames) identified by the encoder 420. For example, independent frames determined by the frame classifier 414 are different from I-frames determined by the encoder 420, and dependent frames determined by the frame classifier 414 are different from B-frames and P-frames determined by the encoder 420.

The predictive generator 416 is configured to improve the downsampling quality to help capture specific degradation characteristics that occur during downsampling and to enable better restoration during the upsampling process. For instance, the predictive generator 416 can predict a characteristic of a frame based on a source of the frame. In one aspect, the characteristic may be a PSF associated with a source of the video, such as a characteristic of an image sensor and corresponding hardware (e.g., lens, etc.). The PSF can also be associated with the frame. For example, the predictive generator 416 can estimate downsampling kernels used for downsampling original frames (e.g., original frame 402), such as by learning a relationship between an original frame patch of an original frame and a corresponding downsampled output frame patch. In some aspects, the training of the predictive generator 416 can be performed using a generative adversarial network (GAN) neural network architecture, such as that described below with respect to FIG. 7A, FIG. 7B, and FIG. 8.

In some aspects, parameters (e.g., weights, biases, etc.) of the predictive generator 416 may be trained using offline training. In some cases, the parameters of the predictive generator 416 can also be fine-tuned using online training (also referred to as fine tuning). The offline training can occur in a separate device from the device hosting the video processor 410, for example, at a server device configured to train the predictive generator 416 with a large training dataset. The online training occurs on the device hosting the video processor 410, such as using frames captured by the device itself. For example, an image sensor of a vehicle may capture various video frames at a beginning of the lifecycle of the device and perform online training (or fine tuning) of the predictive generator 416. Further aspects of the online training (or fine tuning) are described with respect to FIGS. 6, 7A, 7B, and 8.

The kernel estimator 418 is configured to estimate SR kernels (or degradation kernels) for use by the video processor 440 in upsampling decoded frames. In some cases, the SR kernels are based on a PSF (e.g., the SR kernels describe the PSF). The PSF indicates how each pixel in a high-resolution frame is spread or blurred across neighboring pixels in a corresponding low-resolution frame (e.g., a downsampled version of an original frame). In some aspects, the kernel estimator 418 is configured to maintain a relation of a PSF of the original frame 402 and the PSF of the reconstructed frame 404. For example, in order to perform super-resolution (e.g., upsampling by the video processor 440) effectively, it can be important to estimate or approximate the SR kernel accurately, as it varies from source to source. The kernel estimator 418 can estimate downsampling degradation by learning the relationship between the original frame 402 (or an original frame patch of the original frame 402) and the corresponding downsampled frame (or a downsampled patch corresponding to the original frame patch), such as using a loss function (e.g., a perceptual loss function) between predicted feature maps and ground truth feature maps, as described below with respect to FIG. 9 and FIG. 10.

In some cases, the kernel estimator 418 performs kernel estimation as a one-time process for a given input stream source to generate SR kernel priors. The resulting set of SR kernel priors (e.g., a set of 16 3×3 SR kernel priors) provide valuable information that can be used during the upsampling process by an upsampler 442 of the video processor 440 to compensate for the degradation and additive noise. In some cases, parameters (e.g., weights, biases, etc.) of the kernel estimator 418 may be trained using offline training. In some aspects, the parameters of the kernel estimator 418 may also be fine-tuned using online training. For instance, the kernel estimator 418 perform the kernel estimation as part of a fine-tuning or adaptation process where parameters (e.g., weights, biases, and/or other parameters) of a previously-trained neural network model are fine-tuned or adapted based on additional training (e.g., via on-device training on an edge device). For instance, once calibrated (e.g., in 15-20 training epochs) via on-device training (fine-tuning) (e.g., on an edge device, the learned SR kernels (or SR kernel priors) are can be directly used during inference (e.g., in an inference pipeline) of the fine-tuned or adapted neural network model of the kernel estimator 418. In some cases, dual learning can be leveraged. Dual learning involves jointly optimizing the quality of a reconstructed high-resolution frame (e.g., reconstructed frame 404) and an estimated SR kernel, such as by minimizing a high-resolution error frame using a first loss (e.g., an L1 loss function) and a low-resolution error frame using a second loss (e.g., an L2 loss function).

The temporal filter 419 of the video processor 410 can temporally filter frames based on motion to account for temporal noise introduced between frames. In some aspects, the temporal filter 419 is configured to identify optical flow information between a current frame and a previous frame, warp the previous frame using the optical flow information to correspond to a current frame, and generate residual information based on the warped previous frame and the current frame. In this case, the residual information can be applied to the current frame to make the current and previous frames temporally consistent and thus correcting for temporal noise.

As noted previously, the video processor 440 is configured to receive a decoded downsampled frame from the decoder 430 and generate the reconstructed frame 404. In one aspect, the video processor 440 includes the upsampler 442 that is configured to use predictive techniques (e.g., utilizing one or more of the SR kernel priors) to upsample the downsampled frame to generate the reconstructed frame 404. The upsampler 442 includes a frame classifier 444 to classify the downsampled decoded frame as an independent frame or a dependent frame. In some aspects, the upsampler 442 may also use classification results from the frame classifier 414. As noted above, independent frames and dependent frames classified by the frame classifier 444 are different than I-frames, P-frames, and B-frames used by the decoder 430 to decode the frames.

Based on the classification of the downsampled frame, the upsampler 442 is configured to generate (or reconstruct) the reconstructed frame 404 using a first frame generator 446 and a second frame generator 448. In one aspect, the first frame generator 446 may be configured to reconstruct independent frames, and the second frame generator 448 may be configured to reconstruct dependent frames. In some aspects, the first frame generator 446 and the second frame generator 448 are configured to upsample the luminance (or luma) components (Y-components) of the decoded video frames and merge in color components (e.g., chrominance or chroma components, such as chroma-red (Cr) and chroma blue (Cb) components) after upsampling the Y-components to reduce processing cycles of the upsampler 442, first frame generator 446, and/or second frame generator 448.

The video processor 410 and the video processor 440 are ML models that are trained for efficient SR downsampling and SR upsampling. The video processor 410 and the video processor 440 use ML techniques that are more efficient and require fewer processor resources to correct for errors such as temporal misalignment, checkerboarding, staircasing artifacts, blurring, flickering artifacts, compression artifacts, and color bleeding artifacts as compared to conventional logic-based approaches.

Figure 5:
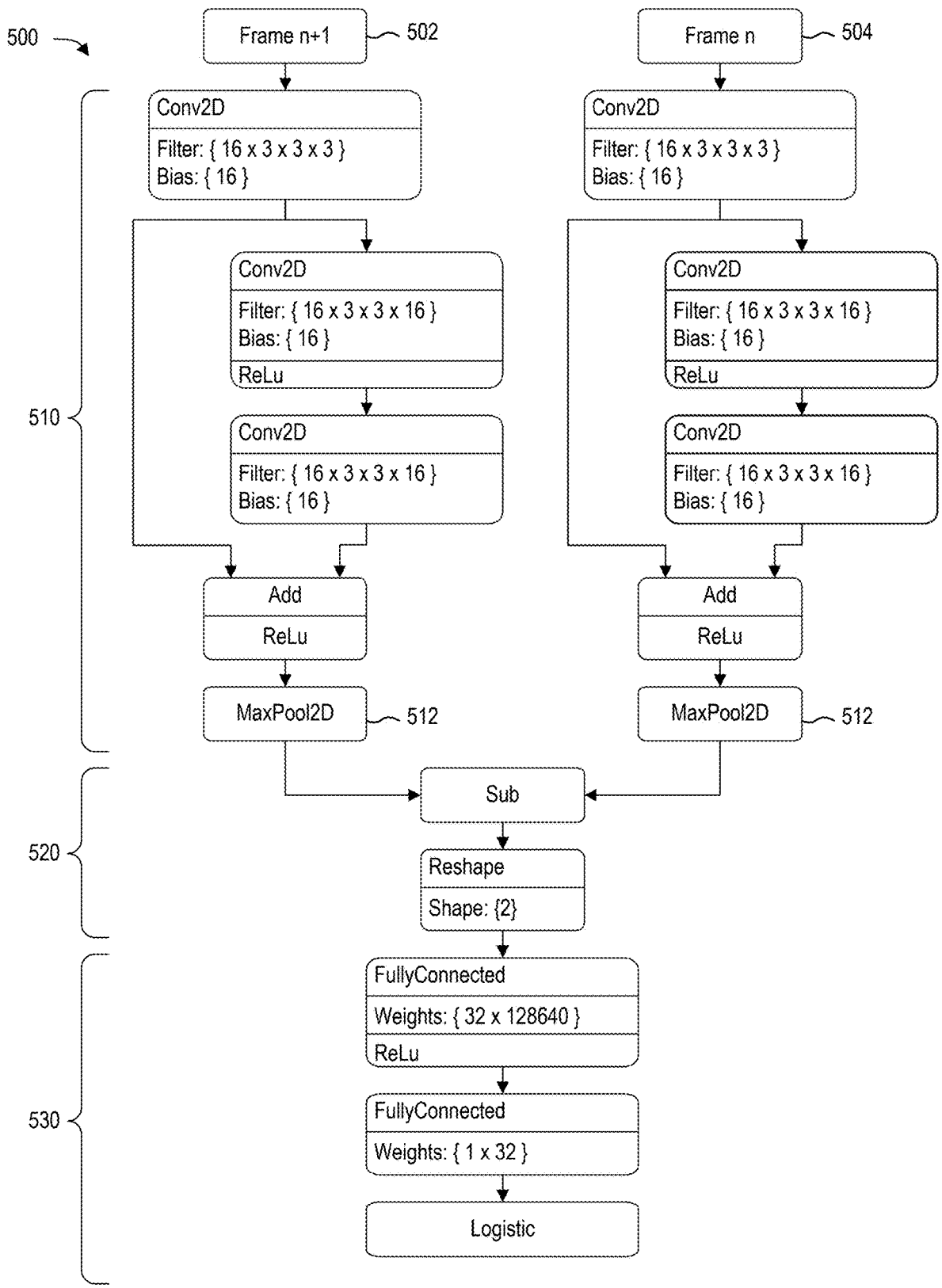
FIG. 5 is an illustration of a frame discriminator of a real-time machine learning based video processing system configured to identify independent frames and dependent frames, in accordance with some aspects of the disclosure.

FIG. 5 is an illustration of a frame classifier 500 of a real-time machine learning based video processing system configured to identify independent frames and dependent frames, in accordance with some aspects of the disclosure. In some aspects, the frame classifier 500 may be used in both the video processor 410 of FIG. 4 (e.g., the frame classifier 414) and the video processor 440 (e.g., the frame classifier 444). In some examples, the frame classifier 500 includes a motion classification neural network model.

The frame classifier 500 can perform feature extraction to extract features from frames (e.g., from a current frame 502 and a previous frame 504). The frame classifier 500 can further perform motion detection to detect the amount of motion and pixel variation between the current frame 502 and the previous frame 504. For instance, to detect the amount of motion and pixel variation between the frames 502, 504, the frame classifier 500 can determine (or calculate) a distance (e.g., a Euclidean distance) between features of the frames 502, 504 (e.g., edge features, such as pooled edge features generated by a pooling layer of the frame classifier 500). The distance provides a measure between the current frame 502 and the previous frame 504. The frame classifier 500 can further classify the determined motion using a perceptual similarity index. For instance, the frame classifier 500 can classify the motion into two classes, including a small class (for small motion) and a large class (for large motion). As described below, a neural network layer (e.g., a fully connected layer) can be used to classify the motion into the two classes.

As noted above, the frame classifier 500 can perform feature extraction. For instance, as shown in FIG. 5, the frame classifier 500 includes a feature extraction layer 510 that includes residual blocks configured to extract features from the current frame 502 and the previous frame 504 (e.g., features from the Y-components or Y-planes of the current frame 502 and the previous frame 504). In some cases, the residual blocks are pretrained. The maxpool layer 512 is configured to perform a pooling operation (e.g., MaxPool) to output edge features (referred to as pooled features) associated with edges of objects in the current frame 502 and the previous frame 504.

The frame classifier 500 also includes a motion detection layer 520 that is configured to identify a difference in motion between the edge features extracted from the current frame 502 and the previous frame 504. In one aspect, the motion detection layer 520 calculates Euclidean distances between the edge features extracted from the current frame 502 and the previous frame 504 to detect the amount of motion and pixel variation between the two frames. The result of the calculation is residual information that can be visually represented by a bitmap with black identifying no change, and the shade of gray identifying a difference.

The similarity detection layer 530 is a fully connected layer that classifies the motion into two different classifications: small movement or large movement. The output of the similarity detection layer 530 is a Boolean value corresponding to similarity of the current frame 502 and the previous frame 504. For example, a Boolean true value may indicate a high similarity corresponding to no motion, and a Boolean value indicates the low similarity corresponding to motion.

Figure 6:
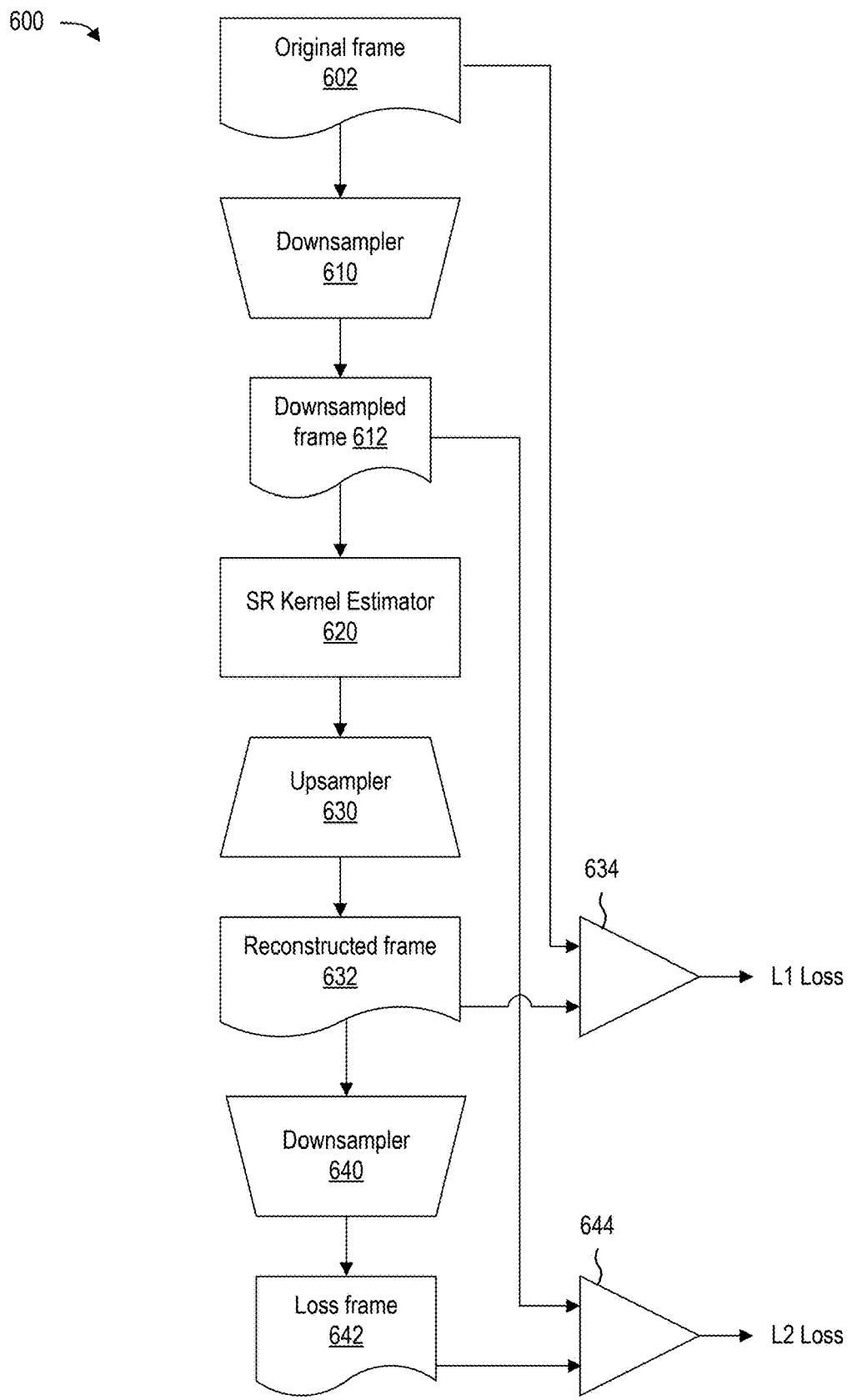
FIG. 6 is a diagram illustrating an example of a downsampler of a deep video compressor architecture, in accordance with some aspects of the disclosure.

FIG. 6 is a conceptual diagram of online training for downsampler 600 of machine learning based video processing system 400, in accordance with some aspects of the disclosure. The downsampler 600 is an example of the downsampler 412 of FIG. 4. In some aspects, the downsampler 600 is configured with a device (e.g., having a computing system 2000 of FIG. 20) or may be configured in an SoC (e.g., the SoC 100 of FIG. 1), or an ISP (e.g., the ISP 254 of FIG. 2). Each device varies due to a number of variations, such as minor process variations in manufacturing, tolerances associated with each component. Fine-tuning of parameters (e.g., weights, biases, etc.) the downsampler 600 can improve video quality and efficiency, such as during the encoding and/or decoding.

In some aspects, the downsampler 600 includes one or more ML models. For example, an original frame 602 is provided to a downsampler 610 configured to downsample the frame into a downsampled frame 612. In some aspects, the downsampler 610 may downsample the original frame 602 based on a PSF of the image sensor (e.g., the ISP 254 of FIG. 2). The downsampler 610 may also downsample the original frame 602 based on a PSF of the frame Conventional ML models for downsampling and upsampling are trained on supervised pairs of source frames with a standard/known degradation kernel. However, in real-world usage, each stream source has its own characteristics and causes conventional ML models to perform poorly based on applying incorrect correction and degrading the effectiveness of upsampling. For example, conventional ML models can create checkerboarding artifacts, staircasing artifacts, blurring, flickering artifacts, compression artifacts, and color bleeding artifacts.

An SR kernel estimator 620 is configured to estimate kernels based on the PSF of original frame 602 and downsampled frame 612 to compensate for degradation noise that occurs during downsampling to generate the downsampled frame 612. The PSF can be used in an upsampling operation to create a reconstructed frame 632 with a high perceptuality similarity to the original frame 602. For example, the downsampler 610 can estimate downsampling kernels by learning the relationship between the original frame 602 (or an image patch of the original frame 602) and a corresponding downsampled frame (or output image patch of the downsampled frame), such as using the GAN described with respect to FIG. 7A, FIG. 7B, and FIG. 8. Non-limiting examples of various PSFs are illustrated in FIG. 7B. In some aspects, the SR kernel estimator 620 is configured to be trained or fine-tuned during an online training portion of the device concurrently with the downsampler (e.g., the downsampler 610) to capture device specific degradation characteristics. If the decoder (e.g., the video processor 440) receives a downsampled frame having deviating characteristics, the upsampled frame can include various artifacts.

Fine-tuning (e.g., via online training) can used to configure the device to provide a stream of frames that allow an SR function to be performed by an upsampler 630 on downsampled encoded frames. In some aspects, during online training, the upsampler 630 can upsample the downsampled frame 612 based on a current kernel estimation by the upsampler to generate a reconstructed frame 632. In this case, a comparator 634 is configured to compare the original frame 602 with the reconstructed frame 632 to identify an L1 loss that occurs based on the downsampling at the downsampler 610 and upsampling at an upsampler 630. During online training, the L1 loss is backpropagated into the downsampler 610 and the SR kernel estimator 620 to train the downsampler 610 and the SR kernel estimator 620.

The reconstructed frame 632 is also returned to the downsampler 610 (shown as downsampler 640 in FIG. 6) to generate a loss frame 642. In some aspects, a comparator 644 is configured to compare the loss frame 642 with the downsampled frame 612 to identify an L2 loss. In some aspects, the L1 loss is a pixel-wise difference between the original frame and the reconstructed frame and may be used to identify weights to estimate the PSF from kernels of the original frame 602. The L2 loss squared difference between the pixels in the downsampled frame 612 and the loss frame 642 and applies a penalty for any differences in the pixels. The L1 loss and the L2 loss are used for backpropagation during online training to tune parameters (e.g., weights, biases, etc.) based on the losses. By tuning the parameters during online training, the device incorporating the downsampler 610 learns in a source-agnostic manner to downsample frames in a way that can prevent various artifacts that can occur as a result of SR functions performed by the upsampler 630.

In some aspects, the downsampler 600 is configured to provide source-agnostic downsampling. Source agnostic downsampling and upsampling are represented by Equation 1 below:

$$I_{LR} = (I_{HR} * k) \downarrow_S + n \qquad \text{(Equation 1)}$$

In equation 1, $I_{LR}$ is a downsampled frame, $I_{HR}$ is an original high-resolution frame, k is downsampling kernel, * is the convolution operation, $\downarrow_S$ is the downsampling factor and n is additive noise. By learning weights in the downsampler based on SR performed at the upsampler, the downsampled frames (e.g., by the downsampler 610) can be source agnostic and improve real-world usage over conventional models trained using a fixed dataset. For example, the downsampler 600 can compensate for the degradation pattern and additive noise that occur during downsampling and can assist the upsampler (e.g., the upsampler 630) to reconstruct the frame with higher fidelity.

Figure 7A:
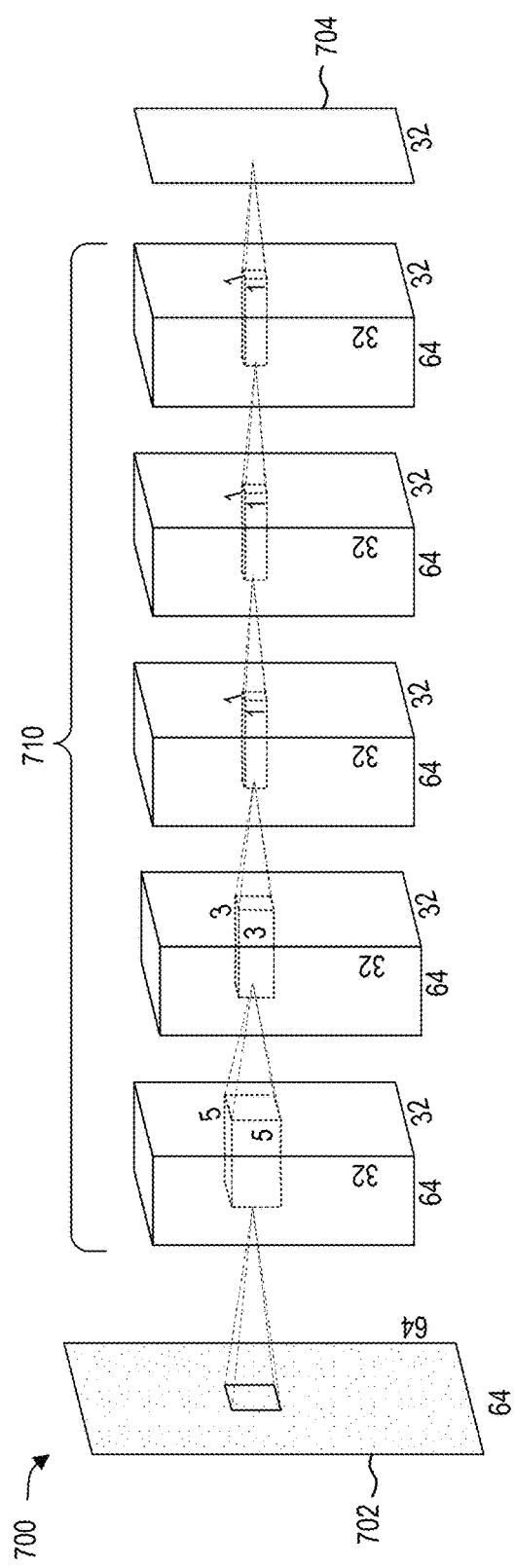
FIG. 7A is a diagram illustrating a generator of a downsampler for fine tuning (via online training) the downsampler, in accordance with some aspects of the disclosure.
Figure 7B:
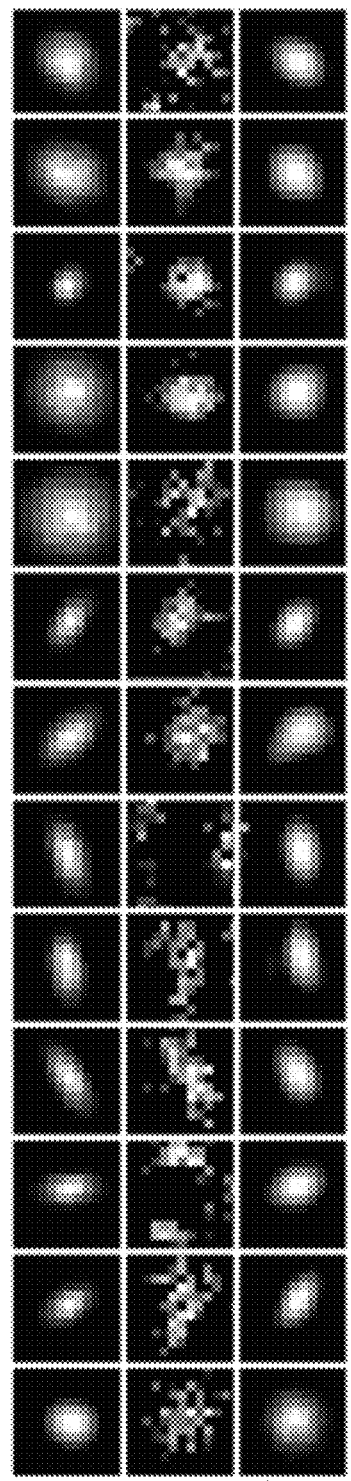
FIG. 7B is a diagram illustrating PSFs of compressions techniques, in accordance with some aspects of the disclosure.

FIG. 7A is a diagram illustrating a predictive generator 700 (e.g., the predictive generator 416) for training (or fine-tuning) a downsampler (e.g., the downsampler 412 of FIG. 4, the downsampler 610 of FIG. 6, etc.), in accordance with some aspects of the disclosure. In some aspects, the predictive generator 700 is part of a GAN network (e.g., a PatchGAN), such as in combination with the discriminator 800 of FIG. 8. In some cases, the generator 700 is configured to improve the downsampling quality and capture the specific degradation characteristics that enable better restoration during the upsampling process. For example, the generator 700 can estimate the downsampling kernels by learning a relationship between a portion (e.g., a patch) of the original frame (e.g., the original frame 602) and a corresponding portion (e.g., a patch) of a downsampled frame (e.g., the downsampled frame 612) based on a discriminator (e.g., a discriminator 800 of FIG. 8).

The generator 700 includes convolution layers 710 that reduce a size of an input frame 702 into an output frame 704 and estimate downsampling kernels (or SR kernels), such as the downsampling kernels 709 of FIG. 7B. In some aspects, the convolution layers 710 to not include an activation layer or any bias to accurately map the characteristics of downsampling kernel using multiple convolution channels representing relationship between portions of the input frame 702 and portions of the output frame 704.

FIG. 7B is a diagram illustrating downsampling kernels associated with operation of the generator 700 of FIG. 7A. The downsampling kernels can be based on PSFs indicating how each pixel in a high-resolution frame (e.g., frame 702) is spread or blurred across neighboring pixels in the low-resolution frame (e.g., the output frame 704) that is a downsampled version of the high-resolution frame. The kernels in FIG. 7B include ground truth kernels 705 associated with downsampling the original frame to the downsampled frame, spreading maps 707 indicating the spreading or blurring of pixels in a single layer, and downsampling kernels generated by the generator 700 of FIG. 7A.

Figure 8:
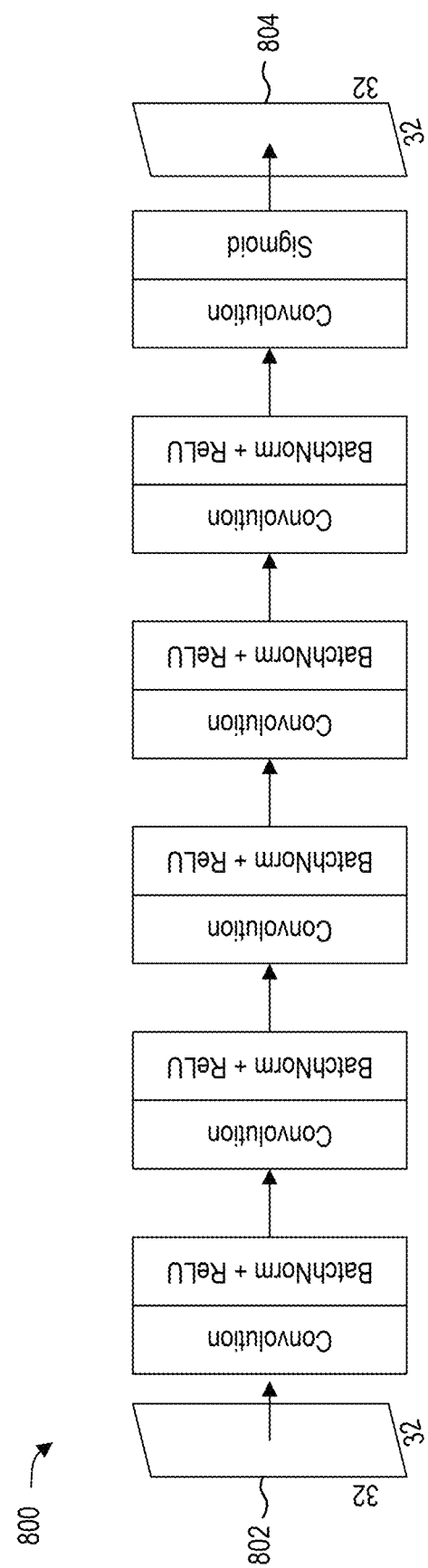
FIG. 8 is a diagram of a discriminator of a downsampler for fine tuning (via online training) the downsampler, in accordance with some aspects of the disclosure.

FIG. 8 is a diagram of a discriminator 800 used in combination with the generator 700 of FIG. 7A training (or fine-tuning) the downsampler (e.g., the downsampler 412 of FIG. 4, the downsampler 610 of FIG. 6, etc.), in accordance with some aspects of the disclosure. In some aspects, the discriminator 800 is part of a GAN network (e.g., a PatchGAN) in combination with the generator 700 of FIG. 7A. In the example of FIG. 8, the discriminator 800 includes layers of convolution, normalization and rectified linear units (ReLU), with a final convolution and sigmoid operation to generate the feature map 804.

The discriminator 800 can receive the original input patch 802 (e.g., a 64×64 portion of the original frame) and a corresponding downsampled patch (e.g., 32×32) and can generate a feature map 804 for both inputs. The downsampled patch can be an output (e.g., the output frame 704) from the generator 700 of FIG. 7A. In some aspects, the feature map 804 corresponds to the PSF of the downsampled frame, and a direct comparison of the feature map can identify a similarity of the feature maps. Based on similarity of the feature maps, the discriminator 800 labels the downsampled patch fake or real. The parameters (e.g., weights, biases, etc.) of the generator 700 of FIG. 7A can continue to be tuned until the discriminator 800 is unable to identify any of the feature maps as fake.

Figure 9:
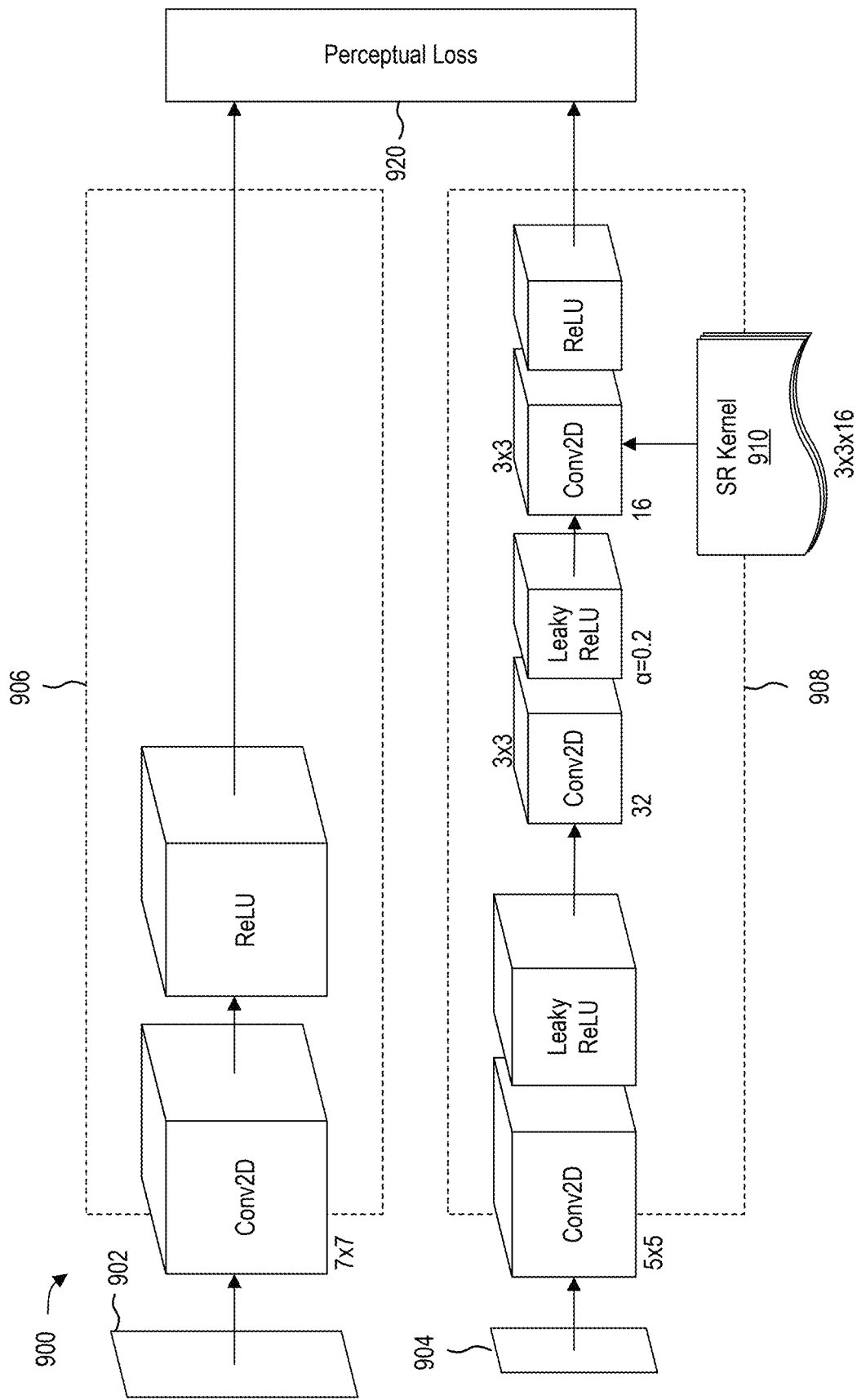
FIG. 9 is a diagram of a super resolution (SR) kernel estimator for predicting a SR kernels for deep compression, in accordance with some aspects of the disclosure.

FIG. 9 is a diagram of an SR kernel estimator 900 for predicting SR kernels for deep compression, in accordance with some aspects of the disclosure. The SR kernel estimator 900 is an example of the kernel estimator 418 of FIG. 4 and the SR kernel estimator 620 of FIG. 6. In some cases, the SR kernel estimator 900 is configured to learn SR kernels, which correspond to a PSF, that are used by the upsampler 630 to upsample frames (e.g., decoded frames).

The SR kernel estimator 900 is configured to use an original patch 902 of a frame and a downsampled patch 904 of a downsampled frame to determine perceptual loss function 920 that identifies a loss between the features of the original patch 902 and the downsampled patch 904. The SR kernel estimator 900 includes a first pipeline 906 for convoluting the original patch 902 into a ground truth feature map and a second pipeline 908 for generating a predicted feature map based on the downsampled patch 904. The ground truth feature map and the predicted feature map are input to determined the perceptual loss function 920, which learns the SR kernel priors 910. The SR kernel priors 910 describe a transformation (e.g., spread or blurred), or a PSF, associated with degradation of the downsampling, in a condensed format. For example, the PSF describes transformation of pixels in a high-resolution frame across neighboring pixels in a low-resolution frame.

The SR kernel varies based on the source input and the correct SR kernel is learned to estimate or approximate the SR kernel based on a comparison of the ground truth from the first pipeline 908 and the downsampled input. The SR function can be improved based on accurate SR kernel accurately, as the SR kernel varies from source to source.

In some aspects, the 16 set of 3×3 SR kernel priors 910 provides information used in the upsampling process to compensate for the degradation and additive noise in the shallow network of the upsampler.

The SR kernel estimation process is a single-shot process that is deployed on-device for offline training. For example, the SR kernel estimator 900 may calibrate the SR kernel priors 910 over 15-20 epochs via on-device training, and the SR kernel priors 910 are then applied into an upsampler (e.g., the video processor 440).

The SR kernel estimator 900 leverages dual learning and jointly optimizes the quality of the reconstructed frame based on the estimated SR kernel and also minimizes the error frame. For example, the L1 loss and the L2 loss illustrated in FIG. 6 are used during the SR kernel estimation process to learn the SR kernel priors 910.

Figure 10:
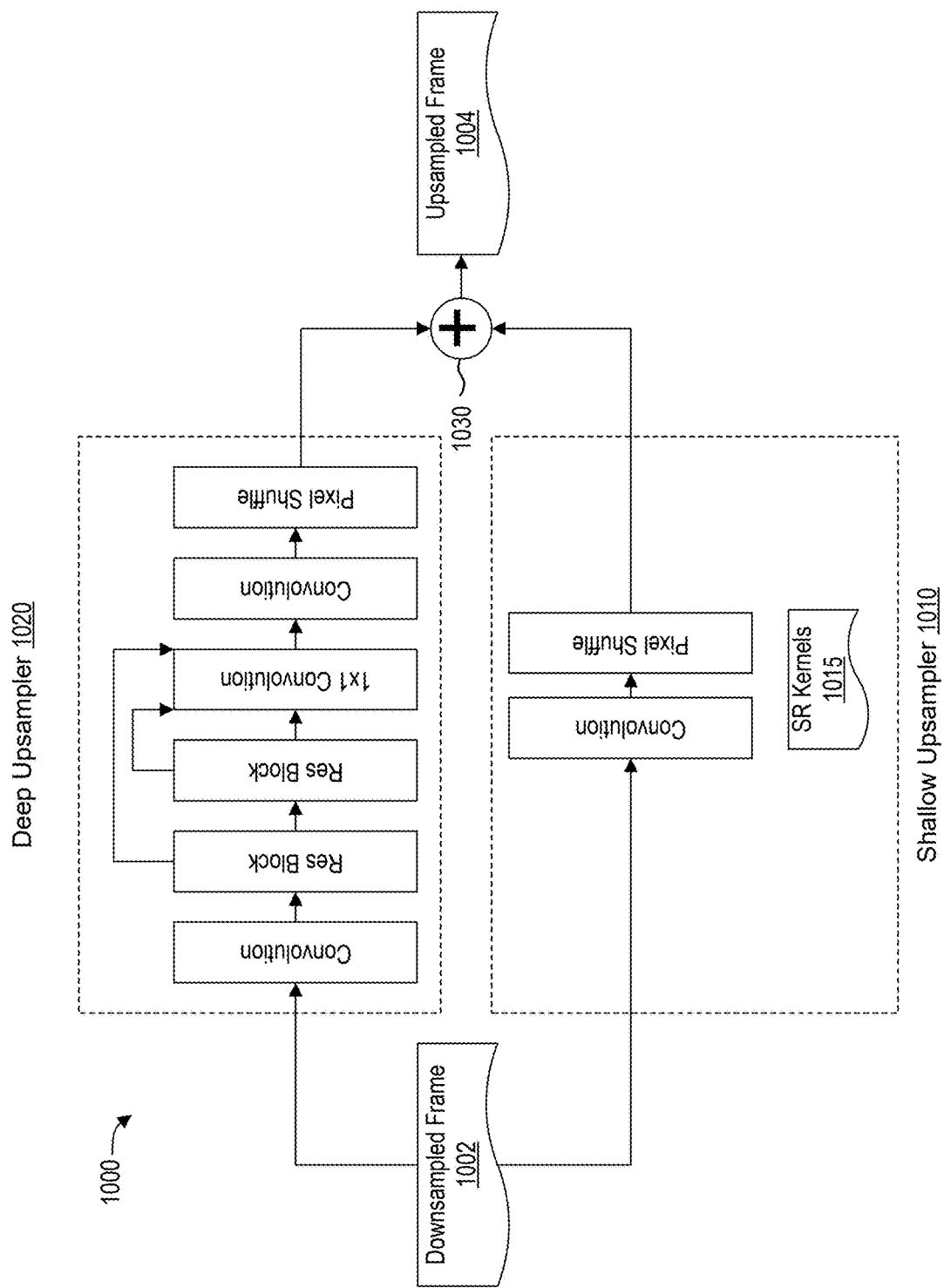
FIG. 10 is a conceptual diagram of an upsampler of a deep decoder network, in accordance with some aspects of the disclosure.

FIG. 10 is a conceptual diagram of an upsampler 1000 of a deep decoder network (e.g., the video processor 440 of FIG. 4), in accordance with some aspects of the disclosure. The upsampler 1000 includes a shallow upsampler 1010 and a deep upsampler 1020 for recovering features from a downsampled frame 1002 and generating an upsampled frame 1004.

The deep upsampler 1020 is configured as a deep neural network and includes various functions to recover high-frequency features within the upsampled frame 1004. The shallow upsampler 1010 is configured to recover low-frequency textures and features in conjunction with the deep upsampler based on the SR kernel 1015 that is learned during the SR kernel estimation process. The SR kernel 1015 may be learned based on the SR kernel estimation process described with respect to FIG. 9.

After the shallow upsampler 1010 and the deep upsampler 1020 each form an upsampled frame, a pixel-wise summation 1030 can be performed to combine each upsampled frame to generate the upsampled frame 1004. In this case, the deep upsampler 1020 and shallow upsampler 1010 recover different features. In this case, as SR kernels 1015 are learned on device, the upsampler 1000 is able to restore the low-frequency features more accurately as compared to conventional bicubic or bilinear approaches.

Figure 11:
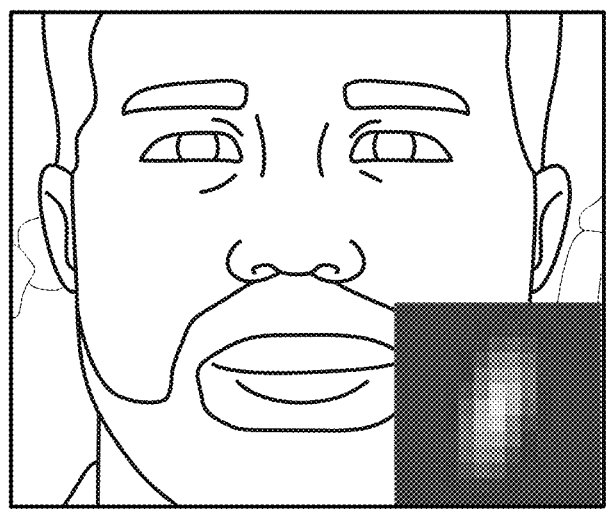
FIG. 11 illustrate an original image and upsampling results of the original image based on upscaling using different techniques.

FIG. 11 illustrates a portion of a high-resolution frame 1100 that is restored based on a conventional SR operation with learned SR kernels and a corresponding PSF associated with the upsampled frame. The resulting textures of the subject in the high-resolution frame 1100 are sharper and fidelity of the edges is maintained after upsampling. The estimated kernels illustrate compensation of the bilinear kernel based on the degradation loss due to the downsampling operation, and provide accurate sharp textures and edges. The estimated SR Kernels (e.g., the SR kernels 1015) in the shallow upsampler (e.g., the shallow upsampler 1010) maintains the variation of edges and features due to accurate down-sampling degradation representation.

Figure 12:
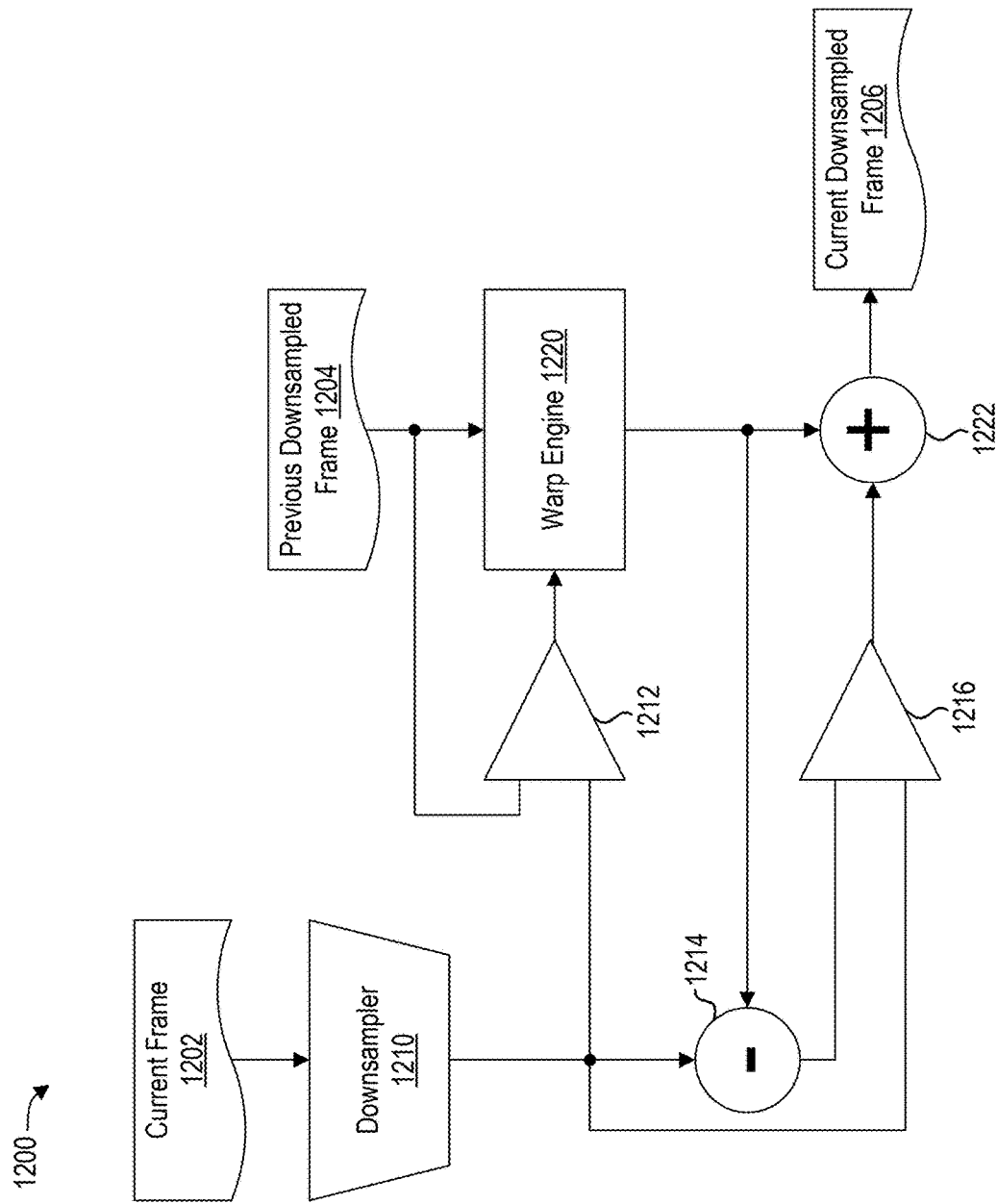
FIG. 12 is a conceptual diagram illustrating a temporal filter for correcting temporal alignment issues, in accordance with some aspects of the disclosure.

FIG. 12 is a conceptual diagram illustrating a temporal filter 1200 for correcting temporal alignment issues, in accordance with some aspects of the disclosure. The temporal filter 1200 is configured to input a current frame 1202, and apply a previous downsampled frame 1204 to generate a current downsampled frame 1206. The current downsampled frame 1206 is modified to add noise that corrects temporal noise that can occur during upsampling.

The temporal filter 1200 illustrates a downsampler 1210 to downsample the current frame 1202 for illustrative purposes, but is not necessarily part of the downsampler 1210. In this case, the current frame 1202 is downsampled and is provided to a first comparator 1212, a subtractive synthesizer 1214, and a second comparator 1216. The previous downsampled frame 1204 is also provided to the first comparator 1212 and the first comparator 1212 is configured to identify an optical flow of pixels between the previous downsampled frame 1204 and the downsampled version of the current frame 1202. The temporal filter 1200 includes a warp engine 1220 that is configured to receive the optical flow information from the first comparator 1212 and generate a predictive frame that estimates how pixels in the previous downsampled frame 1204 have moved with respect to the current frame 1202.

The predictive frame is provided to the subtractive synthesizer 1214 to generate residual information that identifies an error based on the downsampled version of the current frame 1202 and the predictive frame. The residual information is provided to the second comparator 1216, which also receives the downsampled version of the current frame 1202 and generates a differential between the residual information and the downsampled current frame 1202. The differential is then provided to an additive synthesizer 1222, which combines the predictive frame with the differential to construct the current downsampled frame 1206. The residual information is temporally aligned with the previous downsampled frame 1204 and reduces the noise (e.g., motion inconsistencies and artifacts) that can be introduced during upsampling.

In this case, the temporal filter 1200 considers a temporal dimension in connection with the downsampling operation. For example, the temporal filter 1200 may correspond to the temporal filter 419 of the video processor 410 in FIG. 4. The temporal filter 1200 corrects for flickering, misalignments, and other issues that occur between sequential frames.

In some aspects, the temporal filter 1200 may be implemented as a neural network that is configured to determine a sparse motion flow between a previous frame (e.g., the previous downsampled frame 1204) and the current frame (e.g., the current frame 1202). A residual correction block of a neural network may warp the previous frame to generate a residual correction information, identify a residual difference between the frames, and apply the residual difference to make the current frame temporally consistent with the previous frame.

Figure 13:
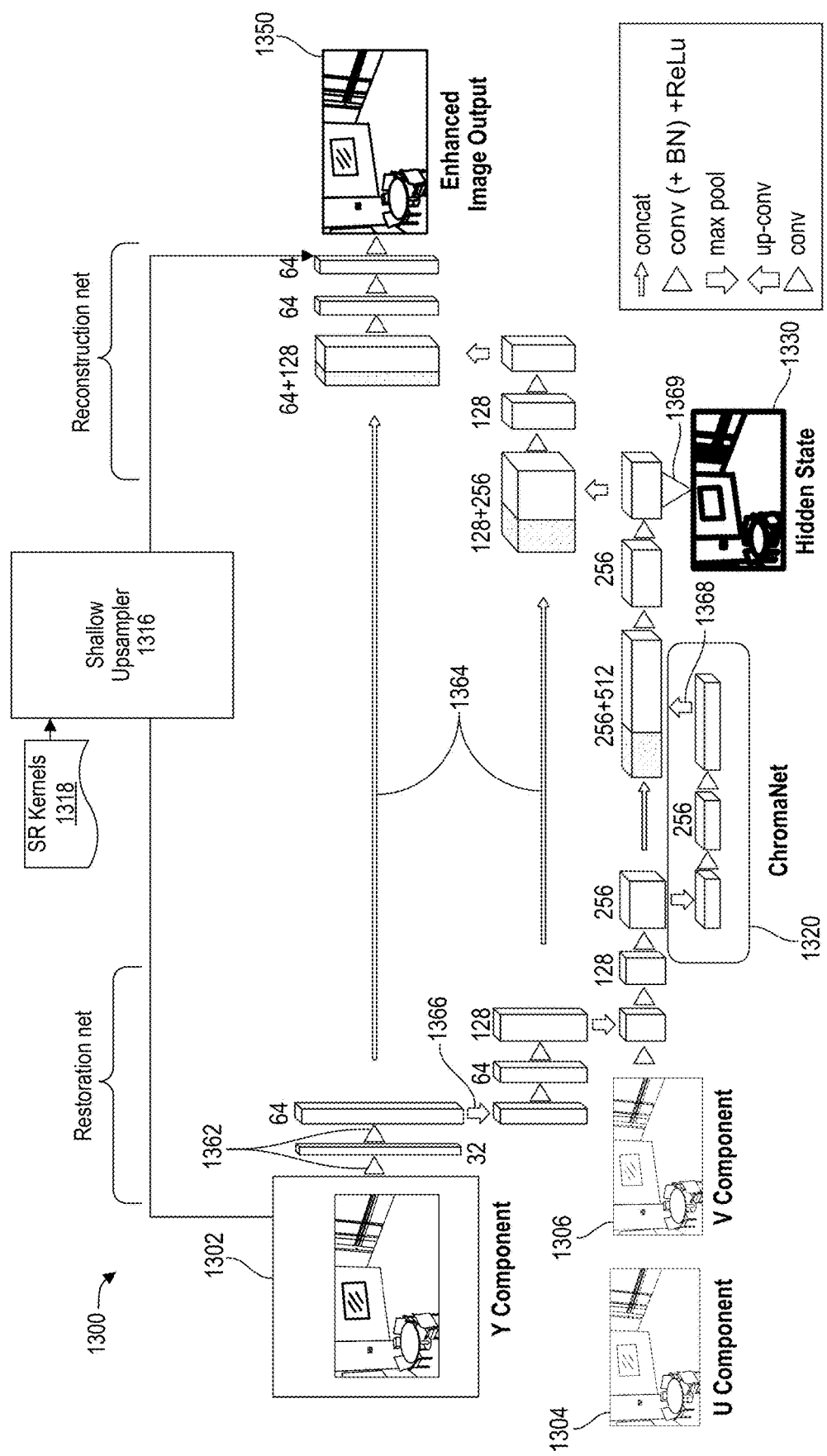
FIG. 13 is a diagram illustrating an example of a independent frame enhancement architecture, in accordance with some examples.

FIG. 13 is a diagram illustrating an example of an independent frame enhancement network 1300, in accordance with some examples. In one illustrative example, the independent frame enhancement network 1300 can be the same as or similar to the first frame generator 446 of FIG. 4.

The independent frame enhancement network 1300 (e.g., also referred to as the "key frame machine learning enhancement network" or the "key frame network") can receive as input a compressed frame such as a YUV frame. In one illustrative example, the systems and techniques can perform one or more preprocessing operations to split the YUV frame into its respective Y (e.g., luma), U (e.g., blue color-difference chroma), and V (e.g., red color-difference chroma) components.

For instance, a YUV frame processed by the independent frame enhancement network 1300 can be the same as or similar to the YUV frame classified as independent frame by the frame classifier 414 or frame classifier 444 of FIG. 4, or the frame classifier 500 of FIG. 5. The independent frame can be pre-processed and split into a Y-plane luma component 1302, a U-plane chroma component 1304, and a V-plane chroma component 1306.

In some aspects, the independent frame enhancement network 1300 can include a luminance enhancement sub-network and a chrominance enhancement sub-network 1320. The luminance enhancement machine learning network can be used to preserve and/or enhance details represented in the independent frame input. For example, the luminance enhancement sub-network can be used to process and enhance the Y-plane luma component 1302 of the independent frame. In some aspects, the Y-plane luma component 1302 can be provided as input to a luminance enhancement sub-network based on a UNet architecture that can be implemented to help preserve image details during enhancement image processing operations. The chrominance enhancement sub-network 1320 can also be referred to as "ChromaNet." In some aspects, the chrominance enhancement sub-network 1320 can be implemented based on a residual Conv-Net architecture. chrominance enhancement sub-network 1320 can be used to enhance the color information represented in the independent frame input. For example, the chrominance enhancement sub-network 1320 can be used to enhance and restores and improves color tone to match the original frame. The chroma-enhanced output (e.g., generated by the chrominance enhancement network 1320) can be fused with a hidden state of the luma enhancement network.

In some examples, the independent frame enhancement network 1300 may also include a shallow upsampler 1316 branch that recovers low frequency features as described above. The shallow upsampler 1316 may implement the functions described in the shallow upsampler 1010, for example using the SR estimated kernels 1318 to correct for various artifacts that occur during SR operation.

In some examples, the chroma-enhanced output can be concatenated with the hidden state of the luma enhancement network, and the used to generate the final enhanced independent frame 1350 that is output by the independent frame enhancement network 1300.

The luminance enhancement sub-network (and the chroma enhancement sub-network 1320) can include a plurality of machine learning layers. For example, the Y-plane luma component 1302 can be provided as input to a pair of convolutional layers 1362. The convolutional layers 1362 can include one or more convolutional layers, one or more batch normalization (BN) layers, and one or more rectified linear unit (ReLu) layers. The luminance enhancement sub-network can include a plurality of concatenation operations or concatenation layers 1364, which can be provided between various pairs of the remaining machine learning layers of luminance enhancement sub-network and/or the independent frame enhancement network 1300.

One or more maxpooling layers 1366 can be provided to perform pooling between the output of one machine layer and the input of another machine learning layer. For example, the one or more maxpooling layers 1366 can be provided between at least a portion of the convolutional+ BN+ReLu layers 1362.

One or more up-convolutional layers 1368 can be provided to implement the independent frame enhancement network 1300. For instance, an up-convolutional layer 1368 can be provided at the output of chrominance enhancement sub-network 1320 and used to fuse or concatenate the output of chrominance enhancement sub-network 1320 with an internal hidden state of the luminance enhancement performed by the independent frame enhancement network 1300.

One or more additional processing steps can be performed by the independent frame enhancement network 1300, after generating the fused concatenation of the chrominance enhancement sub-network 1320 output and the internal hidden state of the luminance enhancement sub-network. In some aspects, the independent frame enhancement network 1300 can include one or more convolutional layers 1369. For example, a convolutional layer 1369 can be used to generate the hidden state output 1330 of the independent frame enhancement network 1300. The hidden state output 1330 can be different from (and generated after) the internal hidden state that is fused with the chrominance enhancement sub-network 1320 output. As will be described in greater depth below, the hidden state output 1330 of independent frame enhancement network 1300 can be provided as input to the dependent frame enhancement network (e.g., dependent frame enhancement network 1400 of FIG. 14) and used to generate (e.g., contributes to) the one or more enhanced dependent frames 1460 of FIG. 14.

The enhanced independent frame 1350 can be generated by the independent frame enhancement network 1300 based on the hidden state output 1330 representative of the fused concatenation of the luminance enhancement sub-network internal hidden state with the output of the chrominance enhancement sub-network 1320. In some aspects, the independent frame enhancement network 1300 can be trained based on a perceptual quality index. For instance, the perceptual quality index (PQI) can be used as a loss function for model pre-training associated with training the independent frame enhancement network 1300. In one illustrative example, the luminance enhancement sub-network and the chrominance enhancement sub-network 1320 can be trained individually. Subsequently, the individually trained luminance enhancement sub-network and the individually trained Chrominance enhancement sub-network 1320 can be combined and trained end-to-end. Following the PQI-based pre-training, GAN-based fine-tuning can be performed to train the independent frame enhancement network 1300 (e.g., after end-to-end training of the combined luminance enhancement sub-network and chrominance enhancement sub-network 1320, GAN-based fine-tuning can be performed).

Figure 14:
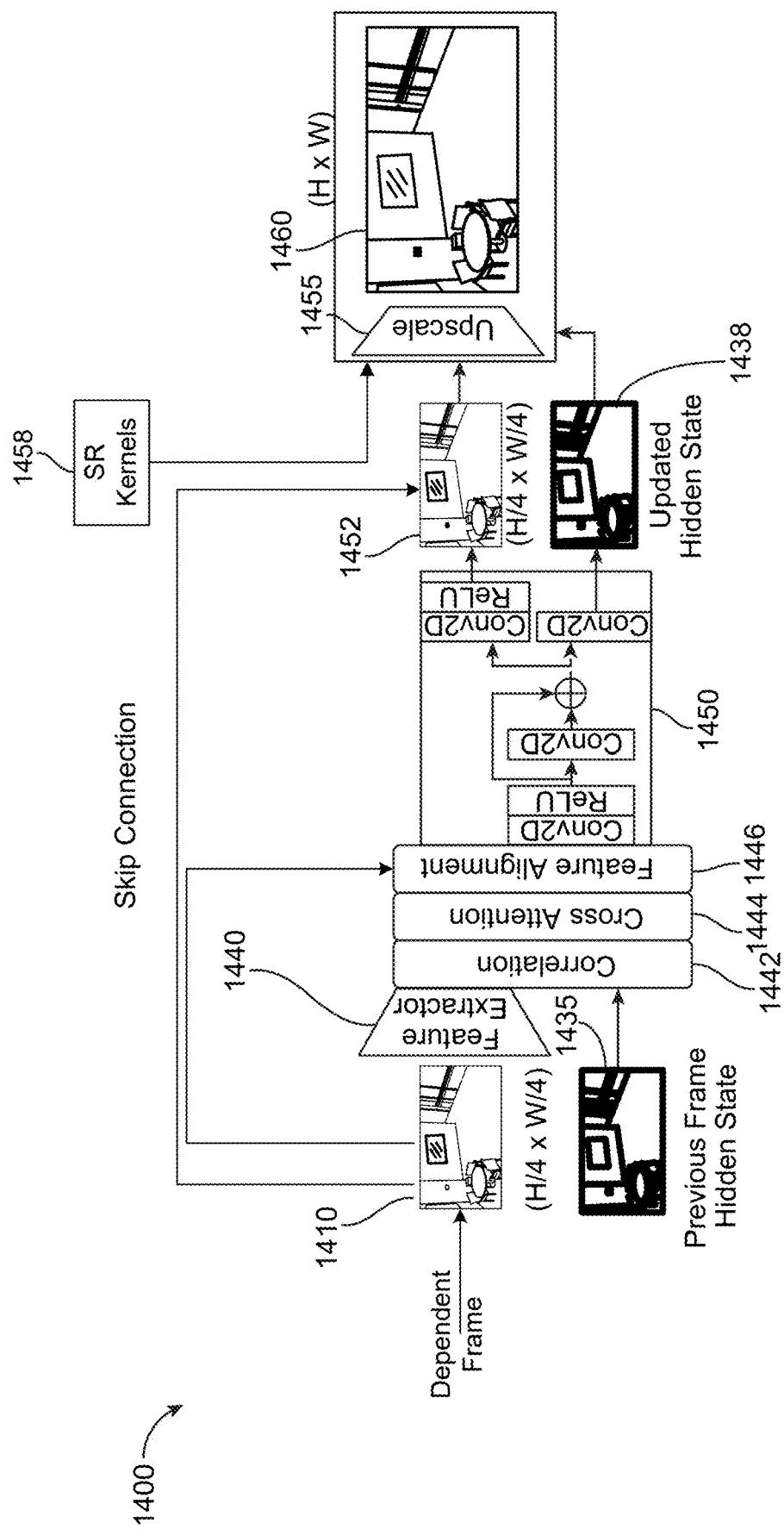
FIG. 14 is a diagram illustrating an example of a dependent frame image enhancement machine learning architecture, in accordance with some examples.

FIG. 14 is a diagram illustrating an example of dependent frame enhancement network 1400, in accordance with some examples. The dependent frame enhancement network 1400 (e.g., also referred to as the "dependent frame enhancement network" or the "dependent frame network") can receive as input the Y-plane luma component 1410 of a YUV frame. The YUV frame can be identified as a frame as described above, for example using the frame classifier 414 or the frame classifier 444 of FIG. 4, or the frame classifier 500 of FIG. 5. In one illustrative example, the systems and techniques The YUV frame processed by the dependent frame enhancement network 1400 can be the same as or similar to the YUV frame classified as a dependent frame by the frame classifier 414 of FIG. 4.

In some aspects, the Y-plane luma component 1410 can be obtained based on splitting a YUV frame (identified as a dependent frame) into its respective Y-plane luma component, U-plane chroma component, and V-plane chroma component, in a manner the same as or similar to that described above with respect to splitting a YUV independent frame into the Y, U, V, components.

In one illustrative example, dependent frame enhancement network 1400 receives as input the Y-plane luma component 1410 of the dependent frame but does not receive the U-plane or V-plane chroma components of the dependent frame. In some aspects, the dependent frame enhancement network 1400 can receive the Y-plane luma component 1410 and the previous frame hidden state 1435, and can use the previous frame hidden state 1435 to recover or otherwise generate accurate color information (e.g., chroma information) corresponding to the Y-plane luma component 1410.

The previous frame hidden state 1435 can be the same as the independent frame hidden state 1330 generated by the independent frame enhancement network 1300 of FIG. 13, in examples where the previous frame $F_{t-1}$ is a independent frame. When the previous frame $F_{t-1}$ is an independent frame, the previous frame hidden state 1435 can be an updated hidden state 1438 that is generated by the dependent frame enhancement network 1400 when processing the previous dependent frame $F_{t-1}$, as will be described in greater depth below. For example, the color components (e.g., chroma components U and V) of the dependent frames can be skipped by the dependent frame enhancement network 1400 for increased computational efficiency, and the previous frame hidden state features 1435 can be used to generate accurate results with enhanced colors.

The Y-plane luma components 1410 can be provided as input to a feature extractor 1440, which generates a plurality of features corresponding to the downscaled Y-plane luma component 1410 of the dependent frame. One or more correlation layers 1442 can receive as input the plurality of features from feature extractor 1440 and the previous frame hidden state 1435. The correlation layers 1442 can utilize the previous frame hidden state features 1435 as a convolution kernel to perform a functional convolution operation. The functional convolution operation compares the Y-plane extracted features (e.g., generated by feature extractor 1440) with the previous frame hidden state features 1435 at each spatial location. The output of the one or more correlation layers 1442 can be a correlation output tensor.

The correlation output tensor generated by the correlation layers 1442 can be provided as input to a cross-attention unit 1444. The cross-attention unit 1444 can include a convolutional+sigmoid activation, which utilizes the correlation output tensor(s) from correlation layers 1442 as input and generates as output an attention map. In some aspects, cross-attention unit 1444 can generate the attention map to be indicative of a mapping between the Y-plane luma components of the dependent frame and the U- and V-plane chroma components of the previous frame (e.g., based on the previous frame hidden state features 1435).

The attention map from the cross-attention unit 1444 can be provided as input to a feature alignment unit 1446. The feature alignment unit 1446 can additionally receive as input the downscaled Y-plane luma components 1410. The feature alignment unit 1446 applies the attention map (e.g., from cross-attention unit 1444) to the features of the downscaled Y-plane luma component 1410, while maintaining temporal consistency. In some aspects, feature alignment unit 1446 can apply the attention map to the features generated by feature extractor 1440 for the downscaled Y-plane luma component 1410.

A warp engine 1450 can include a plurality of convolutional layers (e.g., Conv2D) and one or more ReLu layers. The warp engine 1450 can receive as input the output of feature alignment unit 1446, and may be used to compensate for relative motion between the previous frame $F_{t-1}$ (e.g., the frame associated with the previous frame hidden state 1435) and the current frame $F_t$ (e.g., the dependent frame being processed by the dependent frame enhancement network 1400). For instance, the warp engine 1450 can be used to scale and update the previous frame hidden state 1435 to correspond to the current frame (e.g., to correspond to the Y-frame luma component of the current dependent frame). In some aspects, the warped hidden state is the same as the updated hidden state 1438 (e.g., the updated hidden state 1438 can be generated by using warp engine 1450 to warp the previous frame hidden state 1435 based on the current downscaled Y-plane luma component 1410).

The downscaled Y-plane luma component 1410 of the current dependent frame can be warped with the chroma features of the updated hidden state 1438, and used to generate a enhanced frame output 1452. The enhanced frame output 1452 can have the same pixel dimensions as the downscaled Y-plane luma component 1410, the previous frame hidden state 1435, and the current frame updated hidden state 1438.

In one illustrative example, the dependent frame enhancement network 1400 can include an upscale engine 1455. The upscale engine 1455 can generate the enhanced dependent frame 1460 corresponding to the original resolution dependent frame (e.g., corresponding to the original resolution Y-plane luma component of the dependent frame by utilizing the previous estimated SR kernels 1458).

Figure 15:
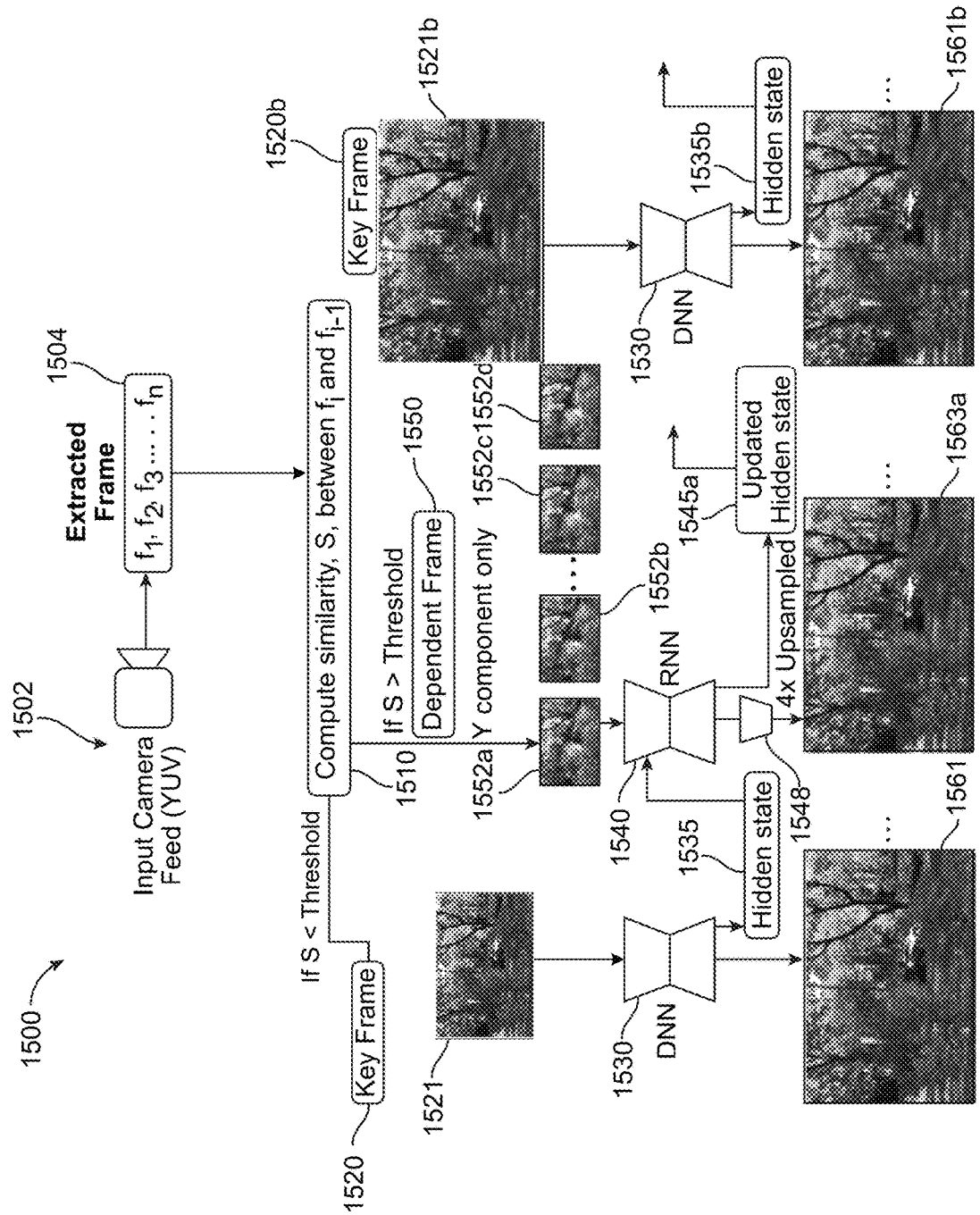
FIG. 15 is a diagram illustrating an example architecture of a deep decoder network including an independent frame image enhancement network and a dependent frame image enhancement network, in accordance with some examples.

FIG. 15 is a diagram illustrating an example architecture of a frame enhancement machine learning network 1500, in accordance with some examples. The frame enhancement network 1500 may include a DNN 1530. The frame enhancement network 1500 further includes an RNN 1540.

A input camera feed 1502 can be provided to the frame enhancement network 1500. The input camera feed 1502 can be associated with a plurality of frames. The plurality of frames can be provided in a YUV format (e.g., YUV 4:2:0), among various other frame formats.

In one illustrative example, the frame extractor 1504 and frame classifier 1510 can be the same as or similar to the frame classifier 414, the frame classifier 444, and the frame classifier 500 of FIG. 5. In some examples, the frame extractor 1504 can be used to generate the selected subset of luma frames from the plurality of images.

Frames (e.g., identified by frame extractor 1504) can proceed to frame type identification engine 1510, which determines a similarity, S, between the current frame Ft and the previous frame Ft−1. In one illustrative example, the frame type identification engine 1510 of FIG. 15 can perform similar or the same operations as that described with respect to FIG. 4 and FIG. 5. The frame type identification engine 1510 can compare the similarity score S between the current frame and the previous frame to a threshold, and determine whether the current frame Ft is a independent frame or a dependent frame (e.g., as also described previously with respect to FIG. 4 and FIG. 5).

If the similarity score, S, is less than the threshold, the frame type identification engine 1510 identifies the current frame Ft as a independent frame 1520 (e.g., shown in FIG. 15 in combination with the underlying YUV frame 1521 associated with the identified independent frame 1520). If the similarity score, S, is not less than the threshold (e.g., is greater than the threshold; is greater than or equal to the threshold; etc.), the frame type identification engine 1510 identifies the current frame Ft as a dependent frame 1550.

The YUV frame 1521 identified as a independent frame 1520 is provided as input to the independent frame DNN 1530, which generates as output an enhanced independent frame 1561 and a corresponding hidden state 1535. The enhanced independent frame 1561 can be the same as or similar to the enhanced frame output 1350 of FIG. 13. The independent frame hidden state 1535 can be the same as or similar to the independent frame hidden state 1330 of FIG. 13. In some aspects, the independent frame 1521 is enhanced based on a quantized DNN model used to implement the DNN 1530. The independent frame hidden state 1535 can include enhanced luma and chrominance features that may be used to perform enhancement of dependent frames (e.g., using the dependent frame RNN 1540).

One or more dependent frames can be associated with the same independent frame. For example, FIG. 15 depicts a first frame 1521 that is identified as an independent frame 1520. Subsequently, the next frame (e.g., next in the sequence of frames obtained from input camera feed 1502) is identified as a dependent frame 1550, and the luma component 1552a is generated and provided to the dependent frame RNN 1540.

The dependent frame RNN 1540 uses the dependent frame luma component 1552a and the previous frame hidden state 1535 (e.g., in this example, the previous frame hidden state 1535 is the independent frame hidden state associated with generating the enhanced independent frame 1561) as inputs to generate an enhanced frame output for the dependent frame. The output of dependent frame RNN 1540 has the same downsampled resolution as the downscaled dependent frame luma component 1552a, and can be provided to an upscaling engine 1548. The upscaling engine 1548 of FIG. 15 can be the same as or similar to the upsampler 1010 of FIG. 10. The output of the upscaling engine 1548 is a dependent frame enhanced frame output 1563a, corresponding to the input dependent frame 1550/dependent frame luma component 1552a.

An updated hidden state 1545a of the dependent frame RNN 1540 can be provided as input for potential use in the processing the next frame of the plurality of frames obtained from input camera feed 1502. For example, if the next frame is also a dependent frame 1550, then the updated hidden state determined for the current frame dependent frame 1552a can be used (e.g., as the previous frame hidden state) to perform frame enhancement for the next dependent frame 1552b.

The process described above can be repeated for each additional dependent frame 1550 that is identified for the same independent frame 1520 (e.g., each of the dependent frames 1552a, 1552b, 1552c, 1552d are similar to and associated with the independent frame image 1521). The same dependent frame RNN 1540 can be used to generate a corresponding enhanced frame output for each of the plurality of dependent frames (e.g., 1552a-d).

In some examples, dependent frame RNN 1540 generates the enhanced frame output for first dependent frame 1552a using the independent frame hidden state 1535.

Dependent frame RNN 1540 can generate the enhanced frame output for second dependent frame 1552b using the updated hidden state 1545a of first dependent frame 1552a as the previous frame hidden state. The updated hidden state 1545*b* of second dependent frame 1552*b* can be used as the previous frame hidden state for generating the enhanced frame output for third dependent frame 1552*c*. The updated hidden state 1545*c* of third dependent frame 1552*c* can be used as the previous frame hidden state for generating the enhanced frame output for fourth dependent frame 1552*d*.

When a new independent frame is identified after one or more previous dependent frames, a new hidden state is calculated. For instance, dependent frames 1552*a-d* are processed by the dependent frame RNN 1540 based on successively or iteratively updating an initial hidden state provided as the independent frame hidden state 1535 corresponding to the independent frame 1521. When a later frame 1521*b* is identified as a new (e.g., second) independent frame 1520*b*, the independent frame DNN 1530 generates an entirely new hidden state 1535*b* based on processing the Y, U, and V components of the new independent frame 1521*b*. For example, the new independent frame hidden state 1535*b* can be generated without reference to (e.g., independently from) either the prior independent frame hidden state 1535 or any of the intervening updated dependent frame hidden states 1545*a-d*.

In one illustrative example, the dependent frame enhancement described herein can be performed in a shorter inference time than the independent frame enhancement described herein. For instance, the independent frame enhancement DNN 1530 may be associated with an inference time of approximately 10 milliseconds (ms) for generating the enhanced output frame 1561 corresponding to the independent frame 1521. The dependent frame enhancement RNN 1540 may be associated with an inference time of approximately 6 milliseconds (ms) for generating the enhanced output frame 1563*a* corresponding to the dependent frame 1552*a*.

Figure 16:
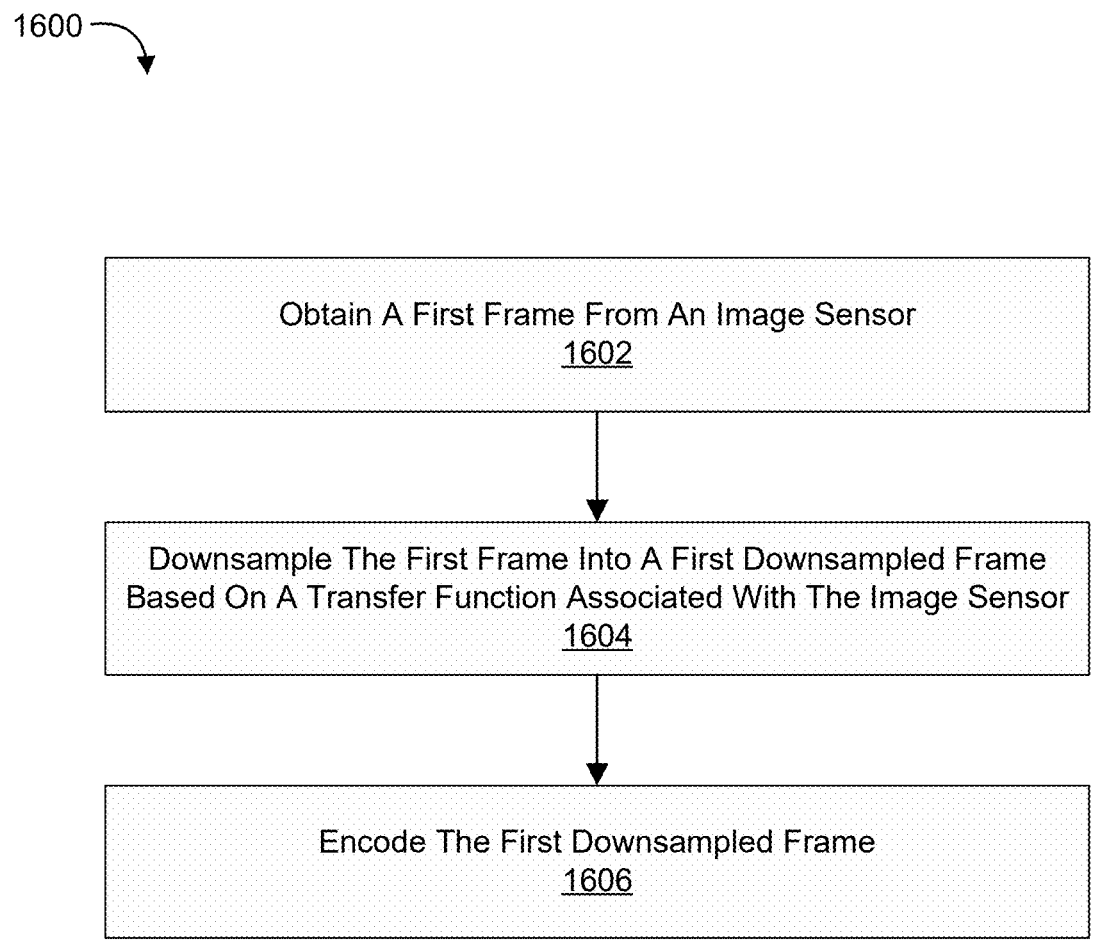
FIG. 16 is a flowchart illustrating an example process for decoding enhanced images from one or more images, in accordance with aspects of the present disclosure.

FIG. 16 is a flowchart illustrating an example method 1600 for processing frames using various ML models in accordance with aspects of the present disclosure. The method 1600 can be performed by a computing device having an image sensor, such as a mobile wireless communication device, a vehicle (e.g., an autonomous or semi-autonomous vehicle, a wireless-enabled vehicle, and/or other type of vehicle) or computing device or system of the vehicle, a robot device or system (e.g., for residential or manufacturing purposes), a camera, an XR device, or another computing device. In one illustrative example, a computing system (e.g., computing system 2000) can be configured to perform all or part of the method 1600.

In some aspects, the computing system may be configured to estimate a transfer function using a trained machine learning model. In some aspects, the transfer function comprises a point spread function The trained machine learning model may be fine tune trained at the computing system. For example, by fine tune training the machine learning model at the computing system, the machine learning model learns characteristics of the computing system that are unique (e.g., properties associated with a lens of an image sensor, etc.).

In one aspect, to estimate of the transfer function, the computing system may downsample, using a downsampler of the trained machine learning model, a second frame captured by the image sensor to generate a second downsampled frame. The computing system may also estimate a super resolution kernel associated with the second downsampled frame. The computing system may upsample the second downsampled frame based on the super resolution kernel to generate a second upsampled frame. The computing system may determine, using a discriminator of the trained machine learning model, a first feature map associated with the second downsampled frame compare the first feature map to a second feature map associated with the second frame. In one example, the discriminator takes a 32×32 subset from the second downsampled frame and determines if the trained machine learning model is predicting the same point spread function which is there in the original image. In one case, the discriminator determines whether the subset is close to real (e.g., a true value) and or fake (e.g., false value). Based on the comparison, the computing system may tune parameters of the downsampler based on a comparison of the first feature map to the second feature map to fine tune performance of the trained machine learning model. For example, the computing system may also identify a loss associated with the downsampling based on the second frame and the second downsampled frame. In this case, the computing system may backpropagate into the trained machine learning model to update the parameters. In one example, the parameters may comprise an estimated super resolution kernel.

In some aspects, the computing system may also estimate the super resolution kernel. The computing system, to estimate the super resolution kernel, may identify first features of the second frame based on applying a first convolutional filter to the second frame and identify second features of the second downsampled frame based on applying a second convolutional filter to the second downsampled frame. The computing system may compare a first PSF associated with the first features and a second PSF associated with the second features and tune parameters of the second convolutional filter based on the comparison of the first PSF and the second PSF. The parameters may be associated with the super resolution kernel.

In another aspect, the computing system may perform a first operation to upsample the second downsampled frame and generate a first portion of the second upsampled frame. For example, the first portion may represent the high frequency content within the image. The computing system may perform a second upsampling to upsample the second downsampled frame using the super resolution kernel into a second portion of the second upsampled frame. For example, the second portion may represent the low frequency content within the image. The computing system may then combine the first portion and the second portion into the second upsampled frame. In this case, the estimating of the transfer function may fine tune train the trained machine learning model based on characteristics of the computing device. In one illustrative example, the fine tune training may take 30 minutes and is performed a single time upon initial startup and may not need to be repeated.

At block 1602, a computing system (e.g., the computing system 2000) may obtain a first frame from an image sensor. For example, the computing system may capture an image for a video conference.

At block 1604, the computing system may downsample the first frame into a first downsampled frame based on the transfer function associated with the image sensor. For example, the transfer function is at least partially determined in connection with the fine tune training. As noted above, by fine tune training at the computing system, the machine learning model learns characteristics of the computing system that are unique (e.g., properties associated with a lens of an image sensor, etc.) and can provide a forward error correction that will be corrected at the decoding.

The computing system, as part of block 1604, may determine a type of the first frame based on a previous frame, and the previous frame may be downsampled into a previous downsampled frame. The type of the first frame comprises an independent frame or a dependent frame. The computing system may modify the first downsampled frame based on the type of the first frame. For example, if the first frame comprises an dependent frame, temporal effects can be introduced that are caused by frame-to-frame motion. In the case of a dependent frame, the computing system may also downsample the first frame at block 1604 to correction alignment errors.

The computing system may also downsample the first frame at block 1604 to correction alignment errors. For example, the computing system is configured to modify the first downsampled frame when the first frame corresponds to the dependent frame. In one aspect, the computing system may determine an optical flow between the previous frame and the first frame and warp the previous downsampled frame based on the optical flow to generate a warped frame. The computing system may also determine a residual error based on a comparison of the previous downsampled frame and the first downsampled frame and update the first downsampled frame based on the residual error. In this case, the residual error can create temporal effects, such as the temporal misalignment described previously. In this case, the computing system corrects for the residual error and prevents temporal artifacts.

At block 1606, the computing system may encode the first downsampled frame. In one aspect, a video encoder of the computing system is configured to encode the first downsampled frame.

Figure 17:
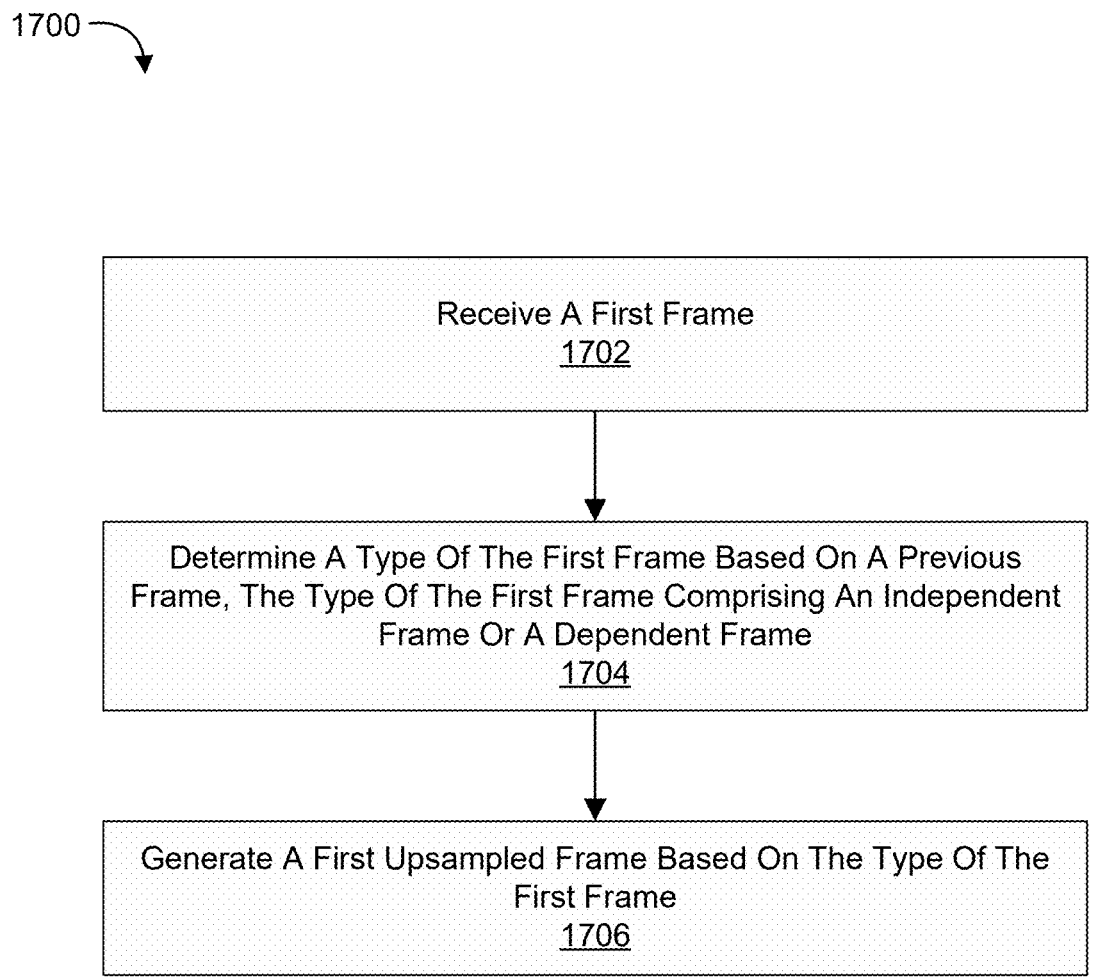
FIG. 17 is a flowchart illustrating an example process for decoding enhanced images from one or more images, in accordance with aspects of the present disclosure.

FIG. 17 is a flowchart illustrating an example method 1700 for processing frames using various ML models in accordance with aspects of the present disclosure. The method 1700 can be performed by a computing device having an image sensor, such as a mobile wireless communication device, a vehicle (e.g., an autonomous or semi-autonomous vehicle, a wireless-enabled vehicle, and/or other type of vehicle) or computing device or system of the vehicle, a robot device or system (e.g., for residential or manufacturing purposes), a camera, an XR device, or another computing device. In one illustrative example, a computing system (e.g., computing system 2000) can be configured to perform all or part of the method 1700.

At block 1702, a computing system (e.g., the computing system 2000) may receive a first frame. For example, the computing system may include a wireless communication transceiver that receives the image from a remote device. In another example, the computing system may store the first frame as part of a multimedia file including a plurality of frames. In some aspects, the first frame is decoded using a video decoder before the operations before block 1704.

At block 1704, the computing system may determine a type of the first frame based on a previous frame. The types of first frame includes an independent frame or a dependent frame. As described in detail above, the similarity of the first frame with respect to a previous frame may be used to identify whether the first frame in independent or dependent.

At block 1706, the computing system may generate a first upsampled frame based on the type of the first frame. In one aspect, as part of block 1706, the computing system may upsample a first component of the first frame into a first portion based on a super resolution kernel based on the first frame corresponding to the independent frame and upsample the first component and at least a second component of the first frame into a second portion. For example, the first component may by a luminance (or Y) component of the first frame. The computing system may form a hidden state component associated with a next frame from the second portion and combine the first portion and the second portion into the first upsampled frame into the first upsampled frame. The hidden state component is applied to the next frame to generate a next upsampled frame For example, the hidden state component may be blue luminance (U) and red luminance (V). In this case, the color components are added to the frame last to preserve the computation power.

In some aspects, the computing system may determine a correlation between a hidden state component associated with the previous frame and a first component of the first frame. The computing system may generate an attention map based the hidden state component and features from the first component of the first frame and blend the first component of the first frame based on the correlation and the attention map into an updated component. In some aspects, the computing system may blend at least a second component of the previous frame with the updated component into the first upsampled frame.

The computing system may also comprise a display. The computing system (e.g., one or more processors) may provide the upsampled frame to the display for output.

In some examples, the methods described herein (e.g., method 1600, method 1700, and/or other method described herein) may be performed by a computing device or apparatus. In one example, the method 1700 can be performed by a computing device having a computing architecture of the computing system 2000 shown in FIG. 20.

The method 1600 and the method 1700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the methods.

The method 1600, the method 1700, and/or other method or process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 18:
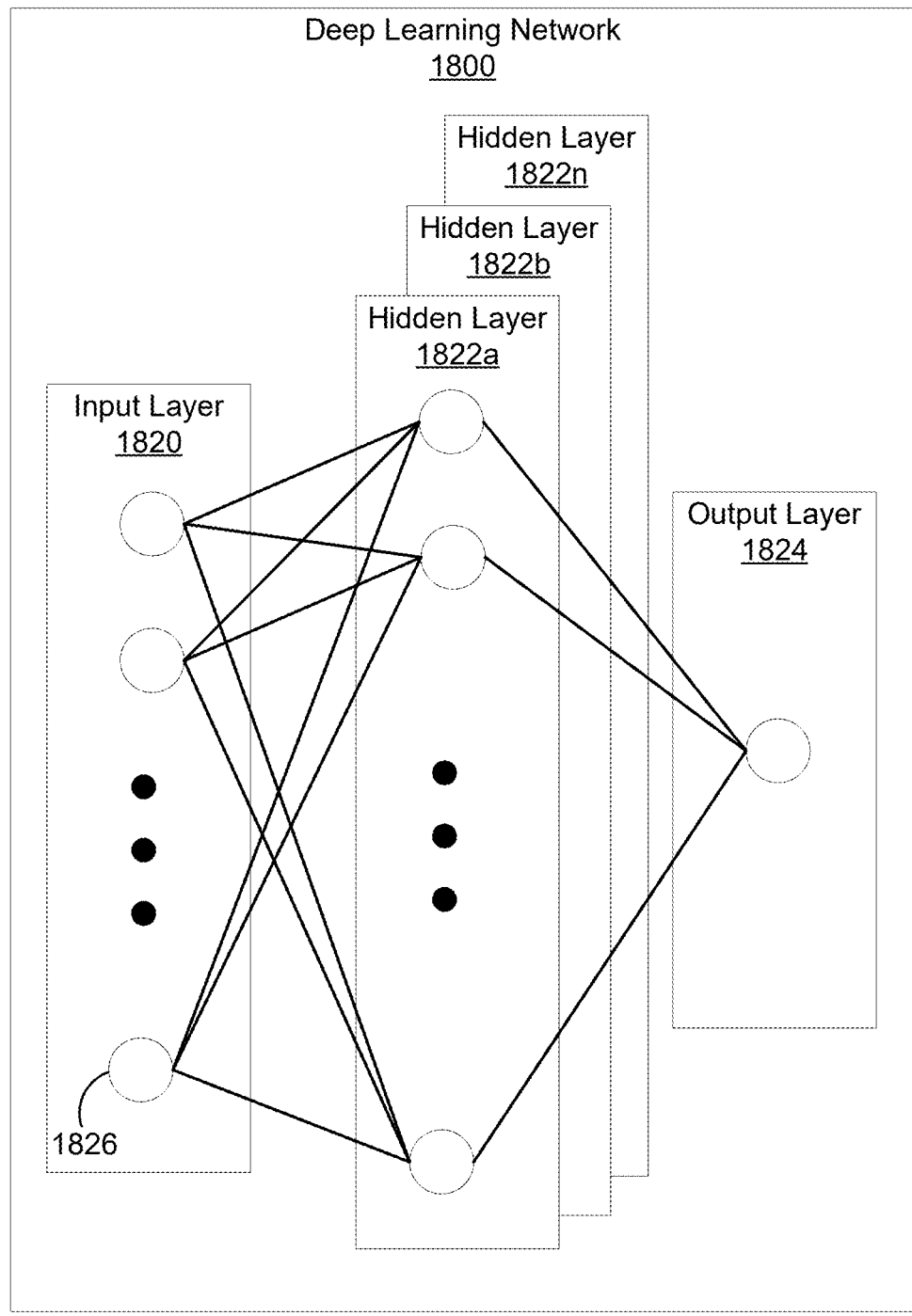
FIG. 18 is an illustrative example of a deep learning neural network that can be used to implement the machine learning-based alignment prediction, in accordance with aspects of the present disclosure.

As noted above, various aspects of the present disclosure can use machine learning models or systems. FIG. 18 is an illustrative example of a deep learning neural network 1800 that can be used to implement the machine learning based alignment prediction described above. An input layer 1820 includes input data. In one illustrative example, the input layer 1820 can include data representing the pixels of an input video frame. The neural network 1800 includes multiple hidden layers 1822a, 1822b, through 1822n. The hidden layers 1822a, 1822b, through 1822n include "n" number of hidden layers, where "n" is an integer greater than or equal to one. The number of hidden layers can be made to include as many layers as needed for the given application. The neural network 1800 further includes an output layer 1824 that provides an output resulting from the processing performed by the hidden layers 1822*a*, 1822*b*, through 1822*n*. In one illustrative example, the output layer 1824 can provide a classification for an object in an input video frame. The classification can include a class identifying the type of activity (e.g., looking up, looking down, closing eyes, yawning, etc.).

The neural network 1800 is a multi-layer neural network of interconnected nodes. Each node can represent a piece of information. Information associated with the nodes is shared among the different layers and each layer retains information as information is processed. In some cases, the neural network 1800 can include a feed-forward network, in which case there are no feedback connections where outputs of the network are fed back into itself. In some cases, the neural network 1800 can include a recurrent neural network, which can have loops that allow information to be carried across nodes while reading in input.

Information can be exchanged between nodes through node-to-node interconnections between the various layers. Nodes of the input layer 1820 can activate a set of nodes in the first hidden layer 1822*a*. For example, as shown, each of the input nodes of the input layer 1820 is connected to each of the nodes of the first hidden layer 1822*a*. The nodes of the first hidden layer 1822*a* can transform the information of each input node by applying activation functions to the input node information. The information derived from the transformation can then be passed to and can activate the nodes of the next hidden layer 1822*b*, which can perform their own designated functions. Example functions include convolutional, up-sampling, data transformation, and/or any other suitable functions. The output of the hidden layer 1822*b* can then activate nodes of the next hidden layer, and so on. The output of the last hidden layer 1822*n* can activate one or more nodes of the output layer 1824, at which an output is provided. In some cases, while nodes (e.g., node 1826) in the neural network 1800 are shown as having multiple output lines, a node has a single output and all lines shown as being output from a node represent the same output value.

In some cases, each node or interconnection between nodes can have a weight that is a set of parameters derived from the training of the neural network 1800. Once the neural network 1800 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1800 to be adaptive to inputs and able to learn as more and more data is processed.

The neural network 1800 is pre-trained to process the features from the data in the input layer 1820 using the different hidden layers 1822*a*, 1822*b*, through 1822*n* in order to provide the output through the output layer 1824. In an example in which the neural network 1800 is used to identify features and/or objects in images, the neural network 1800 can be trained using training data that includes both images and labels, as described above. For instance, training images can be input into the network, with each training frame having a label indicating the features in the images (for a feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1800 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1800 is trained well enough so that the weights of the layers are accurately tuned.

For the example of identifying features and/or objects in images, the forward pass can include passing a training image through the neural network 1800. The weights are initially randomized before the neural network 1800 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 1800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1800 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1800 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1800 can include any other deep network other than a CNN, such as an autoencoder, a deep belief nets (DBNs), a Recurrent Neural Networks (RNNs), among others.

Figure 19:
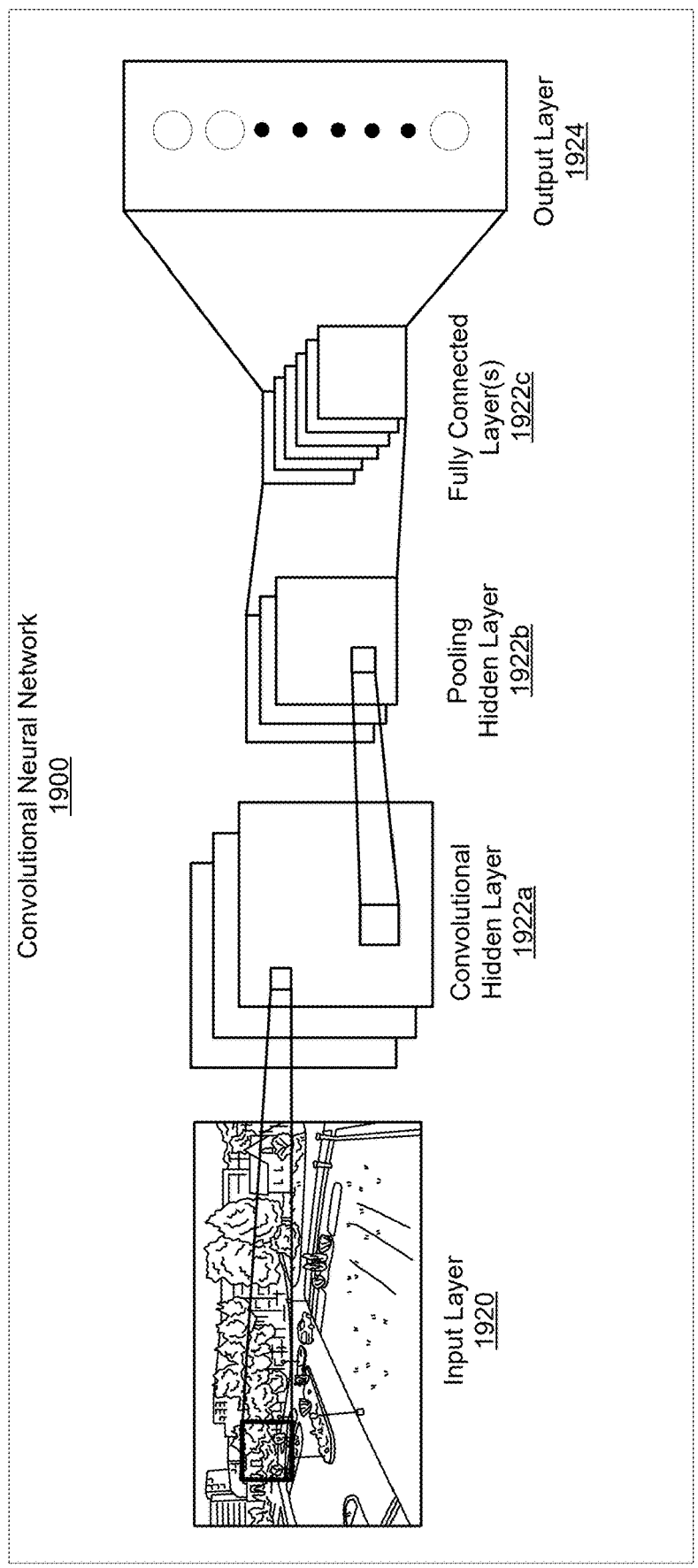
FIG. 19 is an illustrative example of a CNN, in accordance with aspects of the present disclosure.

FIG. 19 is an illustrative example of a CNN 1900. The input layer 1920 of the CNN 1900 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1922a, an optional non-linear activation layer, a pooling hidden layer 1922b, and fully connected hidden layers 1922c to get an output at the output layer 1924. While only one of each hidden layer is shown in FIG. 19, one of ordinary skill will appreciate that multiple convolutional hidden layers, non-linear layers, pooling hidden layers, and/or fully connected layers can be included in the CNN 1900. As previously described, the output can indicate a single class of an object or can include a probability of classes that best describe the object in the image.

The first layer of the CNN 1900 is the convolutional hidden layer 1922a. The convolutional hidden layer 1922a analyzes the image data of the input layer 1920. Each node of the convolutional hidden layer 1922a is connected to a region of nodes (pixels) of the input image called a receptive field. The convolutional hidden layer 1922a can be considered as one or more filters (each filter corresponding to a different activation or feature map), with each convolutional iteration of a filter being a node or neuron of the convolutional hidden layer 1922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1922a. Each connection between a node and a receptive field for that node learns a weight and, in some cases, an overall bias such that each node learns to analyze its particular local receptive field in the input image. Each node of the hidden layer 1922a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1922a is due to each node of the convolutional layer being applied to its corresponding receptive field. For example, a filter of the convolutional hidden layer 1922a can begin in the top-left corner of the input image array and can convolve around the input image. As noted above, each convolutional iteration of the filter can be considered a node or neuron of the convolutional hidden layer 1922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1922a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1922a.

The mapping from the input layer to the convolutional hidden layer 1922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1922a can include several activation maps in order to identify multiple features in an image. The example shown in FIG. 19 includes three activation maps. Using three activation maps, the convolutional hidden layer 1922a can detect three different kinds of features, with each feature being detectable across the entire image.

In some examples, a non-linear hidden layer can be applied after the convolutional hidden layer 1922a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1900 without affecting the receptive fields of the convolutional hidden layer 1922a.

The pooling hidden layer 1922b can be applied after the convolutional hidden layer 1922a (and after the non-linear hidden layer when used). The pooling hidden layer 1922b is used to simplify the information in the output from the convolutional hidden layer 1922a. For example, the pooling hidden layer 1922b can take each activation map output from the convolutional hidden layer 1922a and generates a condensed activation map (or feature map) using a pooling function. Max-pooling is one example of a function performed by a pooling hidden layer. Other forms of pooling functions be used by the pooling hidden layer 1922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1922a. In the example shown in FIG. 19, three pooling filters are used for the three activation maps in the convolutional hidden layer 1922a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1922a having a dimension of 24×24 nodes, the output from the pooling hidden layer 1922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1800.

The final layer of connections in the network is a fully-connected layer that connects every node from the pooling hidden layer 1822b to every one of the output nodes in the output layer 1824. Using the example above, the input layer includes 28×28 nodes encoding the pixel intensities of the input image, the convolutional hidden layer 1822a includes 3×24×24 hidden feature nodes based on application of a 5×5 local receptive field (for the filters) to three activation maps, and the pooling hidden layer 1822b includes a layer of 3×12×12 hidden feature nodes based on application of max-pooling filter to 2×2 regions across each of the three feature maps. Extending this example, the output layer 1824 can include ten output nodes. In such an example, every node of the 3×12×12 pooling hidden layer 1822b is connected to every node of the output layer 1824.

The fully connected layer 1822c can obtain the output of the previous pooling hidden layer 1822b (which should represent the activation maps of high-level features) and determines the features that most correlate to a particular class. For example, the fully connected layer 1822c layer can determine the high-level features that most strongly correlate to a particular class, and can include weights (nodes) for the high-level features. A product can be computed between the weights of the fully connected layer 1822c and the pooling hidden layer 1822b to obtain probabilities for the different classes. For example, if the CNN 1800 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1824 can include an M-dimensional vector (in the prior example, M=10). M indicates the number of classes that the CNN 1800 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 20:
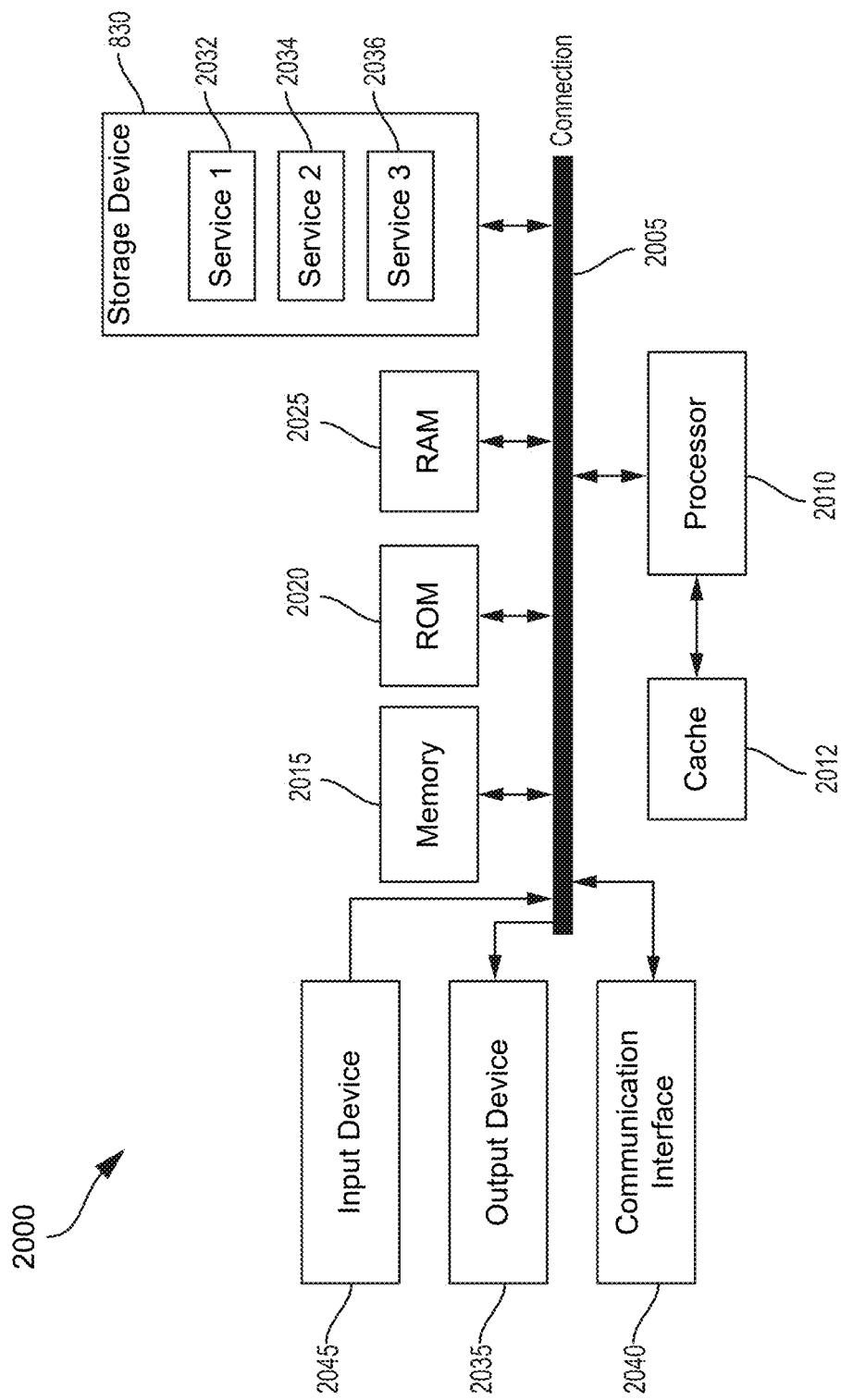
FIG. 20 is a diagram illustrating an example of a system for implementing certain aspects described herein.

FIG. 20 is a diagram illustrating an example of a system for implementing certain aspects of the present technology. In particular, FIG. 20 illustrates an example of computing system 2000, which can be for example any computing device making up internal computing system, a remote computing system, a camera, or any component thereof in which the components of the system are in communication with each other using connection 2005. Connection 2005 can be a physical connection using a bus, or a direct connection into processor 2010, such as in a chipset architecture. Connection 2005 can also be a virtual connection, networked connection, or logical connection.

In some aspects, computing system 2000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 2000 includes at least one processing unit (CPU or processor) 2010 and connection 2005 that couples various system components including system memory 2015, such as ROM 2020 and RAM 2025 to processor 2010. Computing system 2000 can include a cache 2012 of high-speed memory connected directly with, in close proximity to, or integrated as part of processor 2010.

Processor 2010 can include any general purpose processor and a hardware service or software service, such as services 2032, 2034, and 2036 stored in storage device 2030, configured to control processor 2010 as well as a special-purpose processor where software instructions are incorporated into the actual processor design. Processor 2010 may essentially be a completely self-contained computing system, containing multiple cores or processors, a bus, memory controller, cache, etc. A multi-core processor may be symmetric or asymmetric.

To enable user interaction, computing system 2000 includes an input device 2045, which can represent any number of input mechanisms, such as a microphone for speech, a touch-sensitive screen for gesture or graphical input, keyboard, mouse, motion input, speech, etc. Computing system 2000 can also include output device 2035, which can be one or more of a number of output mechanisms. In some instances, multimodal systems can enable a user to provide multiple types of input/output to communicate with computing system 2000. Computing system 2000 can include communications interface 2040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 2040 may also include one or more Global Navigation Satellite System (GNSS) receivers or transceivers that are used to determine a location of the computing system 2000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 2030 can include software services, servers, services, etc., that when the code that defines such software is executed by the processor 2010, it causes the system to perform a function. In some aspects, a hardware service that performs a particular function can include the software component stored in a computer-readable medium in connection with the necessary hardware components, such as processor 2010, connection 2005, output device 2035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the methods described herein (e.g., method 1600, method 1700 and/or other process described herein) may be performed by a computing device or apparatus. In one example, the method 1600 can be performed by a computing device having a computing architecture of the computing system 2000 shown in FIG. 20.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of methods described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the present disclosure include:

Aspect 1. An apparatus configured to process one or more frames, comprising: one or more memories; and one or more processors coupled to the one or more memories and configured to: obtain a first frame from an image sensor; downsample the first frame into a first downsampled frame based on a transfer function associated with the image sensor; and encode the first downsampled frame.

Aspect 2. The apparatus of Aspect 1, wherein the one or more processors are configured to: estimate the transfer function using a trained machine learning model.

Aspect 3. The apparatus of Aspect 2, wherein the one or more processors are configured to: downsample, using a downsampler of the trained machine learning model, a second frame captured by the image sensor to generate a second downsampled frame; estimate a super resolution kernel associated with the second downsampled frame; and upsample the second downsampled frame based on the super resolution kernel to generate a second upsampled frame.

Aspect 4. The apparatus of Aspect 3, wherein the one or more processors are configured to: determine, using a discriminator of the trained machine learning model, a first feature map associated with the second downsampled frame; compare the first feature map to a second feature map associated with the second frame; and tune parameters of the downsampler based on a comparison of the first feature map to the second feature map.

Aspect 5. The apparatus of Aspect 4, wherein the parameters comprise an estimated super resolution kernel.

Aspect 6. The apparatus of any one of Aspects 3 to 5, wherein the one or more processors are configured to: identify a loss associated with the downsampling of the second frame based on the second frame and the second downsampled frame.

Aspect 7. The apparatus of any one of Aspects 3 to 6, wherein, to estimate the super resolution kernel, the one or more processors are configured to: identify first features of the second frame based on applying a first convolutional filter to the second frame; identify second features of the second downsampled frame based on applying a second convolutional filter to the second downsampled frame; compare a first point spread function (PSF) associated with the first features and a second PSF associated with the second features; and tune parameters of the second convolutional filter based on the comparison of the first PSF and the second PSF, wherein the parameters are associated with the super resolution kernel.

Aspect 8. The apparatus of any one of Aspects 3 to 7, wherein the one or more processors are configured to: perform a first operation to upsample the second downsampled frame and generate a first portion of the second upsampled frame; perform a second upsampling to upsample the second downsampled frame using the super resolution kernel into a second portion of the second upsampled frame; and combine the first portion and the second portion into the second upsampled frame.

Aspect 9. The apparatus of any one of Aspects 1 to 8, wherein the one or more processors are configured to: determine a type of the first frame based on a previous frame, wherein the previous frame is downsampled into a previous downsampled frame, wherein the type of the first frame comprises an independent frame or a dependent frame; and modify the first downsampled frame based on the type of the first frame.

Aspect 10. The apparatus of Aspect 9, wherein the one or more processors are configured to modify the first downsampled frame when the first frame corresponds to the dependent frame.

Aspect 11. The apparatus of any one of Aspects 9 or 10, wherein the one or more processors are configured to: determine an optical flow between the previous frame and the first frame; warp the previous downsampled frame based on the optical flow to generate a warped frame; determine a residual error based on a comparison of the previous downsampled frame and the first downsampled frame; and update the first downsampled frame based on the residual error.

Aspect 12. The apparatus of any one of Aspects 1 to 11, wherein a video encoder is configured to encode the first downsampled frame.

Aspect 13. The apparatus of any one of Aspects 1 to 12, wherein the transfer function comprises a point spread function.

Aspect 14. The apparatus of any one of Aspects 1 to 13, further comprising the image sensor, integrated into a camera, wherein the image sensor is configured to capture the first frame.

Aspect 15. An apparatus configured to process one or more frames, comprising: one or more memories; and one or more processors are coupled to the one or more memories and configured to: receive a first frame; determine a type of the first frame based on a previous frame, wherein the type of the first frame comprises an independent frame or a dependent frame; and generate a first upsampled frame based on the type of the first frame.

Aspect 16. The apparatus of Aspect 15, wherein the one or more processors are configured to: upsample a first component of the first frame into a first portion based on a super resolution kernel based on the first frame corresponding to the independent frame; upsample the first component and at least a second component of the first frame into a second portion; form a hidden state component associated with a next frame from the second portion; and combine the first portion and the second portion into the first upsampled frame into the first upsampled frame.

Aspect 17. The apparatus of Aspect 16, wherein the hidden state component is applied to the next frame to generate a next upsampled frame.

Aspect 18. The apparatus of any one of Aspects 15 to 17, wherein the one or more processors are configured to: determine a correlation between a hidden state component associated with the previous frame and a first component of the first frame; generate an attention map based the hidden state component and features from the first component of the first frame; blend the first component of the first frame based on the correlation and the attention map into an updated component; and blend at least a second component of the previous frame with the updated component into the first upsampled frame.

Aspect 19. The apparatus of any one of Aspects 15 to 18, further comprising a display configured to display the first upsampled frame.

Aspect 20. An image signal processor configured to process one or more frames, comprising: one or more processors coupled to one or more memories and configured to: obtain a first frame from an image sensor; downsample the first frame into a first downsampled frame based on a transfer function associated with the image sensor; and encode the first downsampled frame.

Aspect 21. The image signal processor of Aspect 20, wherein the one or more processors are configured to: estimate the transfer function using a trained machine learning model.

Aspect 22. The image signal processor of Aspect 21, wherein the one or more processors are configured to: downsample, using a downsampler of the trained machine learning model, a second frame captured by the image sensor to generate a second downsampled frame; estimate a super resolution kernel associated with the second downsampled frame; and upsample the second downsampled frame based on the super resolution kernel to generate a second upsampled frame.

Aspect 23. The image signal processor of Aspect 22, wherein the one or more processors are configured to: determine, use a discriminator of the trained machine learning model, a first feature map associated with the second downsampled frame; compare the first feature map to a second feature map associated with the second frame; and tune parameters of the downsampler based on a comparison of the first feature map to the second feature map.

Aspect 24. The image signal processor of Aspect 23, wherein the parameters comprise an estimated super resolution kernel.

Aspect 25. The image signal processor of any one of Aspects 22 to 24, wherein the one or more processors are configured to: identify a loss associated with the downsampling of the second frame based on the second frame and the second downsampled frame.

Aspect 26. The image signal processor of any one of Aspects 22 to 25, wherein the one or more processors are configured to: estimate the super resolution kernel further comprises: identify first features of the second frame based on applying a first convolutional filter to the second frame; identify second features of the second downsampled frame based on applying a second convolutional filter to the second downsampled frame; compare a first point spread function (PSF) associated with the first features and a second PSF associated with the second features; and tune parameters of the second convolutional filter based on the comparison of the first PSF and the second PSF, wherein the parameters are associated with the super resolution kernel.

Aspect 27. The image signal processor of any one of Aspects 22 to 26, wherein the one or more processors are configured to: perform a first operation to upsample the second downsampled frame and generate a first portion of the second upsampled frame; perform a second upsampling to upsample the second downsampled frame using the super resolution kernel into a second portion of the second upsampled frame; and combine the first portion and the second portion into the second upsampled frame.

Aspect 28. The image signal processor of any one of Aspects 20 to 27, wherein the one or more processors are configured to: determine a type of the first frame based on a previous frame, wherein the previous frame is downsampled into a previous downsampled frame, wherein the type of the first frame comprises an independent frame or a dependent frame; and modify the first downsampled frame based on the type of the first frame.

Aspect 29. The image signal processor of Aspect 28, wherein the one or more processors are configured to: modify the first downsampled frame when the first frame corresponds to the dependent frame.

Aspect 30. The image signal processor of any one of Aspects 28 or 29, wherein the one or more processors are configured to: determine an optical flow between the previous frame and the first frame; warp the previous downsampled frame based on the optical flow to generate a warped frame; determine a residual error based on a comparison of the previous downsampled frame and the first downsampled frame; and update the first downsampled frame based on the residual error.

Aspect 31. The image signal processor of any one of Aspects 20 to 30, wherein a video encoder is configured to encode the first.

Aspect 32. The image signal processor of any one of Aspects 20 to 31, wherein the one or more processors comprise a digital signal processor (DSP).

Aspect 33. The image signal processor of any one of Aspects 20 to 32, further comprising one or more memories configured to store the encoded first downsampled frame.

Aspect 34. A method of processing one or more frames, the method comprising: obtaining a first frame from an image sensor; downsampling the first frame into a first downsampled frame based on a transfer function associated with the image sensor; and encoding the first downsampled frame.

Aspect 35. The method of Aspect 34, further comprising: estimating the transfer function using a trained machine learning model.

Aspect 36. The method of Aspect 35, further comprising: downsampling, using a downsampler of the trained machine learning model, a second frame captured by the image sensor to generate a second downsampled frame; estimating a super resolution kernel associated with the second downsampled frame; and upsampling the second downsampled frame based on the super resolution kernel to generate a second upsampled frame.

Aspect 37. The method of Aspect 36, further comprising: determining, using a discriminator of the trained machine learning model, a first feature map associated with the second downsampled frame; comparing the first feature map to a second feature map associated with the second frame; and tuning parameters of the downsampler based on a comparison of the first feature map to the second feature map.

Aspect 38. The method of Aspect 37, wherein the parameters comprise an estimated super resolution kernel.

Aspect 39. The method of any one of Aspects 36 to 38, further comprising: identifying a loss associated with the downsampling of the second frame based on the second frame and the second downsampled frame.

Aspect 40. The method of any one of Aspects 36 to 39, wherein estimating the super resolution kernel comprises: identifying first features of the second frame based on applying a first convolutional filter to the second frame; identifying second features of the second downsampled frame based on applying a second convolutional filter to the second downsampled frame; comparing a first point spread function (PSF) associated with the first features and a second PSF associated with the second features; and tuning parameters of the second convolutional filter based on the comparison of the first PSF and the second PSF, wherein the parameters are associated with the super resolution kernel.

Aspect 41. The method of any one of Aspects 36 to 40, further comprising: performing a first operation to upsample the second downsampled frame and generate a first portion of the second upsampled frame; performing a second upsampling to upsample the second downsampled frame using the super resolution kernel into a second portion of the second upsampled frame; and combining the first portion and the second portion into the second upsampled frame.

Aspect 42. The method of any one of Aspects 34 to 41, further comprising: determining a type of the first frame based on a previous frame, wherein the previous frame is downsampled into a previous downsampled frame, wherein the type of the first frame comprises an independent frame or a dependent frame; and modifying the first downsampled frame based on the type of the first frame.

Aspect 43. The method of Aspect 42, further comprising modifying the first downsampled frame when the first frame corresponds to the dependent frame.

Aspect 44. The method of any one of Aspects 42 or 43, further comprising: determining an optical flow between the previous frame and the first frame; warping the previous downsampled frame based on the optical flow to generate a warped frame; determining a residual error based on a comparison of the previous downsampled frame and the first downsampled frame; and updating the first downsampled frame based on the residual error.

Aspect 45. The method of any one of Aspects 34 to 44, wherein the first downsampled frame is encoded using video encoder.

Aspect 46. The method of any one of Aspects 34 to 45, wherein the transfer function comprises a point spread function.

Aspect 47. The method of any one of Aspects 34 to 46, further comprising capturing the first frame using the image sensor, wherein the image sensor is integrated into a camera.

Aspect 48. A method of processing one or more frames, the method comprising: receiving a first frame; determining a type of the first frame based on a previous frame, wherein the type of the first frame comprises an independent frame or a dependent frame; and generating a first upsampled frame based on the type of the first frame.

Aspect 49. The method of Aspect 48, further comprising: upsampling a first component of the first frame into a first portion based on a super resolution kernel based on the first frame corresponding to the independent frame; upsampling the first component and at least a second component of the first frame into a second portion; forming a hidden state component associated with a next frame from the second portion; and combining the first portion and the second portion into the first upsampled frame into the first upsampled frame.

Aspect 50. The method of Aspect 49, wherein the hidden state component is applied to the next frame to generate a next upsampled frame.

Aspect 51. The method of any one of Aspects 48 to 50, further comprising: determining a correlation between a hidden state component associated with the previous frame and a first component of the first frame; generating an attention map based the hidden state component and features from the first component of the first frame; blending the first component of the first frame based on the correlation and the attention map into an updated component; and blending at least a second component of the previous frame with the updated component into the first upsampled frame.

Aspect 52. A non-transitory computer-readable storage medium comprising instructions stored thereon which, when executed by one or more processors, causes the one or more processors to perform operations according to any of Aspects 34 to 47.

Aspect 53. An apparatus for processing one or more frames, comprising one or more means for performing operations according to any of Aspects 34 to 47.

Aspect 54. A non-transitory computer-readable storage medium comprising instructions stored thereon which, when executed by one or more processors, causes the one or more processors to perform operations according to any of Aspects 48 to 51.

Aspect 55. An apparatus for processing one or more frames, comprising one or more means for performing operations according to any of Aspects 48 to 51.

What is claimed is:

1. An apparatus configured to process one or more frames, comprising:
   one or more memories; and
   one or more processors coupled to the one or more memories and configured to:
     obtain a first frame from an image sensor;
     downsample the first frame into a first downsampled frame based on a transfer function associated with the image sensor;
     estimate the transfer function using a trained machine learning model;
     downsample, using a downsampler of the trained machine learning model, a second frame captured by the image sensor to generate a second downsampled frame; and
     estimate a super resolution kernel associated with the second downsampled frame; and
     upsample the second downsampled frame based on the super resolution kernel to generate a second upsampled frame.

2. The apparatus of claim 1, wherein the one or more processors are configured to:
   determine, using a discriminator of the trained machine learning model, a first feature map associated with the second downsampled frame;
   compare the first feature map to a second feature map associated with the second frame; and
   tune parameters of the downsampler based on a comparison of the first feature map to the second feature map.

3. The apparatus of claim 2, wherein the parameters comprise the estimated super resolution kernel.

4. The apparatus of claim 1, wherein the one or more processors are configured to:
   identify a loss associated with the downsampling of the second frame based on the second frame and the second downsampled frame.

5. The apparatus of claim 1, wherein, to estimate the super resolution kernel, the one or more processors are configured to:
   identify first features of the second frame based on applying a first convolutional filter to the second frame;
   identify second features of the second downsampled frame based on applying a second convolutional filter to the second downsampled frame;
   compare a first point spread function (PSF) associated with the first features and a second PSF associated with the second features; and
   tune parameters of the second convolutional filter based on the comparison of the first PSF and the second PSF, wherein the parameters are associated with the super resolution kernel.

6. The apparatus of claim 1, wherein the one or more processors are configured to:
   perform a first operation to upsample the second downsampled frame and generate a first portion of the second upsampled frame;
   perform a second upsampling to upsample the second downsampled frame using the super resolution kernel into a second portion of the second upsampled frame; and
   combine the first portion and the second portion into the second upsampled frame.

7. The apparatus of claim 1, wherein the one or more processors are configured to:
   determine a type of the first frame based on a previous frame, wherein the previous frame is downsampled into a previous downsampled frame, wherein the type of the first frame comprises an independent frame or a dependent frame; and
   modify the first downsampled frame based on the type of the first frame.

8. The apparatus of claim 7, wherein the one or more processors are configured to modify the first downsampled frame when the first frame corresponds to the dependent frame.

9. The apparatus of claim 7, wherein the one or more processors are configured to:
   determine an optical flow between the previous frame and the first frame;
   warp the previous downsampled frame based on the optical flow to generate a warped frame;
   determine a residual error based on a comparison of the previous downsampled frame and the first downsampled frame; and
   update the first downsampled frame based on the residual error.

10. The apparatus of claim 1, wherein a video encoder is configured to encode the second upsampled frame.

11. The apparatus of claim 1, wherein the transfer function comprises a point spread function.

12. The apparatus of claim 1, further comprising the image sensor, integrated into a camera, wherein the image sensor is configured to capture the first frame.

13. An apparatus configured to process one or more frames, comprising:
   one or more memories; and
   one or more processors are coupled to the one or more memories and configured to:
      receive a first frame;
      determine a type of the first frame based on a previous frame, wherein the type of the first frame comprises an independent frame or a dependent frame;
      upsample a first component of the first frame into a first portion based on a super resolution kernel based on the first frame corresponding to the independent frame;
      upsample the first component and at least a second component of the first frame into a second portion; and
      combine the first portion and the second portion into the first upsampled frame into the first upsampled frame.

14. The apparatus of claim 13, wherein the one or more processors are configured to:
   form a hidden state component associated with a next frame from the second portion.

15. The apparatus of claim 14, wherein the hidden state component is applied to the next frame to generate a next upsampled frame.

16. The apparatus of claim 13, wherein the one or more processors are configured to:
   determine a correlation between a hidden state component associated with the previous frame and a first component of the first frame;
   generate an attention map based the hidden state component and features from the first component of the first frame;
   blend the first component of the first frame based on the correlation and the attention map into an updated component; and
   blend at least a second component of the previous frame with the updated component into the first upsampled frame.

17. The apparatus of claim 13, further comprising a display configured to display the first upsampled frame.

18. An image signal processor configured to process one or more frames, comprising:
   one or more processors coupled to one or more memories and configured to:
      obtain a first frame from an image sensor;
      downsample the first frame into a first downsampled frame based on a transfer function associated with the image sensor;
      estimate the transfer function using a trained machine learning model;
      downsample, using a downsampler of the trained machine learning model, a second frame captured by the image sensor to generate a second downsampled frame;
   estimate a super resolution kernel associated with the second downsampled frame; and
   upsample the second downsampled frame based on the super resolution kernel to generate a second upsampled frame.

19. The image signal processor of claim 18, wherein the one or more processors are configured to:
   determine, use a discriminator of the trained machine learning model, a first feature map associated with the second downsampled frame;
   compare the first feature map to a second feature map associated with the second frame; and
   tune parameters of the downsampler based on a comparison of the first feature map to the second feature map.

20. The image signal processor of claim 18, wherein the parameters comprise an estimated super resolution kernel.

21. The image signal processor of claim 18, wherein the one or more processors are configured to:
   identify a loss associated with the downsampling of the second frame based on the second frame and the second downsampled frame.

22. The image signal processor of claim 18, wherein the one or more processors are configured to:
   estimate the super resolution kernel further comprises:
   identify first features of the second frame based on applying a first convolutional filter to the second frame;
   identify second features of the second downsampled frame based on applying a second convolutional filter to the second downsampled frame;
   compare a first point spread function (PSF) associated with the first features and a second PSF associated with the second features; and
   tune parameters of the second convolutional filter based on the comparison of the first PSF and the second PSF, wherein the parameters are associated with the super resolution kernel.

23. The image signal processor of claim 18, wherein the one or more processors are configured to:
   perform a first operation to upsample the second downsampled frame and generate a first portion of the second upsampled frame;
   perform a second upsampling to upsample the second downsampled frame using the super resolution kernel into a second portion of the second upsampled frame; and
   combine the first portion and the second portion into the second upsampled frame.

24. The image signal processor of claim 18, wherein the one or more processors are configured to:
  determine a type of the first frame based on a previous frame, wherein the previous frame is downsampled into a previous downsampled frame, wherein the type of the first frame comprises an independent frame or a dependent frame; and
  modify the first downsampled frame based on the type of the first frame.

25. The image signal processor of claim 24, wherein the one or more processors are configured to:
  modify the first downsampled frame when the first frame corresponds to the dependent frame.

26. The image signal processor of claim 24, wherein the one or more processors are configured to:
  determine an optical flow between the previous frame and the first frame;
  warp the previous downsampled frame based on the optical flow to generate a warped frame;
  determine a residual error based on a comparison of the previous downsampled frame and the first downsampled frame; and
  update the first downsampled frame based on the residual error.

* * * * *